US009694872B2

(12) United States Patent
Laroche et al.

(10) Patent No.: US 9,694,872 B2
(45) Date of Patent: Jul. 4, 2017

(54) STORAGE BIN AND RADIATOR ASSEMBLY FOR A VEHICLE

(71) Applicant: BOMBARDIER RECREATIONAL PRODUCTS INC., Valcourt (CA)

(72) Inventors: David Laroche, Sherbrooke (CA); Andre Gilbert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/021,566

(22) PCT Filed: Sep. 15, 2014

(86) PCT No.: PCT/IB2014/064532
§ 371 (c)(1),
(2) Date: Mar. 11, 2016

(87) PCT Pub. No.: WO2015/036984
PCT Pub. Date: Mar. 19, 2015

(65) Prior Publication Data
US 2016/0221636 A1    Aug. 4, 2016

Related U.S. Application Data

(60) Provisional application No. 61/877,654, filed on Sep. 13, 2013.

(51) Int. Cl.
*B62M 7/02* (2006.01)
*B62K 5/027* (2013.01)
(Continued)

(52) U.S. Cl.
CPC ............... *B62M 7/02* (2013.01); *B62K 5/027* (2013.01); *B62K 5/05* (2013.01); *B62K 5/08* (2013.01); *B62K 11/00* (2013.01); *B62K 19/46* (2013.01)

(58) Field of Classification Search
CPC ... B62K 5/02; B62K 5/05; B62K 5/08; B62K 5/027; B62K 19/46; B62M 7/02; B62D 25/085; B62J 7/00; B62J 7/02; B62J 7/06
See application file for complete search history.

(56) References Cited

U.S. PATENT DOCUMENTS 3,851,630 A   12/1974 Foster
4,618,020 A   10/1986 Noda et al.
(Continued)

FOREIGN PATENT DOCUMENTS

FR           977123 A        3/1951
WO    2013/095881 A1        6/2013

OTHER PUBLICATIONS

International Search Report with regard to PCT/2014/064532 mailed on Jan. 26, 2015.
(Continued)

Primary Examiner — Brian Swenson
(74) Attorney, Agent, or Firm — BCF LLP

(57) ABSTRACT

A vehicle has a frame, a straddle seat supported by the frame, a left front wheel and a right front wheel and at least one rear wheel operatively connected to the frame. An engine is supported by the frame and operatively connected to at least one of the wheels. A front cowling assembly is supported by the frame. A storage bin is disposed at least in part inside the front cowling assembly. At least one radiator fluidly communicates with the engine for cooling the engine. At least a portion of at least one of the at least one radiator is longitudinally and vertically aligned with at least a portion of the storage bin.

20 Claims, 18 Drawing Sheets

(51) Int. Cl.
*B62K 5/05* (2013.01)
*B62K 19/46* (2006.01)
*B62K 5/08* (2006.01)
*B62K 11/00* (2006.01)

(56) References Cited

U.S. PATENT DOCUMENTS

| | | | |
|---|---|---|---|
| 5,715,778 A | 2/1998 | Hasumi et al. | |
| 5,992,554 A * | 11/1999 | Hasumi | B60K 11/04 123/41.51 |
| 6,622,806 B1 | 9/2003 | Matsuura | |
| 7,380,624 B2 | 6/2008 | Momosaki | |
| 7,464,781 B2 * | 12/2008 | Guay | B60K 11/04 180/215 |
| 7,543,672 B2 | 6/2009 | Codere et al. | |
| 7,654,357 B2 | 2/2010 | Buell et al. | |
| 7,806,215 B2 | 10/2010 | Codere et al. | |
| 8,539,929 B2 * | 9/2013 | Dees | F02F 1/40 123/198 E |
| 8,827,028 B2 * | 9/2014 | Sunsdahl | B62D 21/183 180/292 |
| 2004/0035623 A1 | 2/2004 | Fecteau et al. | |
| 2005/0217909 A1 | 10/2005 | Guay et al. | |
| 2005/0257972 A1 | 11/2005 | Iwami et al. | |
| 2013/0186701 A1 * | 7/2013 | Bedard | B62K 5/027 180/210 |

OTHER PUBLICATIONS

English Translation of FR977123 (Description and Claims) retrieved on Espacenet on Mar. 10, 2016.
Supplementary European Search Report with regard to the counterpart EP Application EP14843381.6 mailed May 18, 2017.

\* cited by examiner

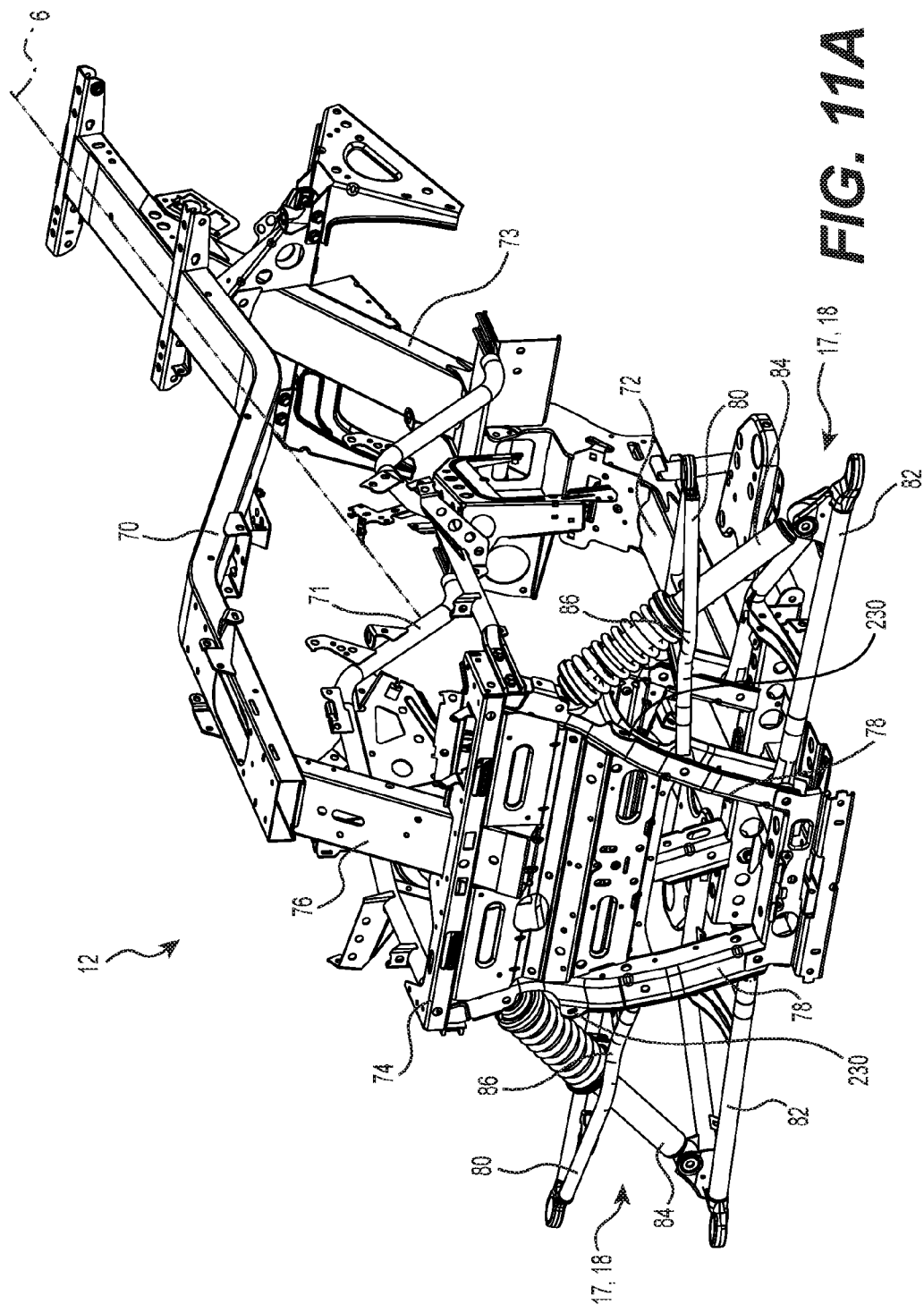

STORAGE BIN AND RADIATOR ASSEMBLY FOR A VEHICLE

CROSS-REFERENCE

The present application claims priority to U.S. Provisional Patent Application No. 61/877,654, filed on Sep. 13, 2013, the entirety of which is incorporated herein by reference. The present application is related to International Patent Application No. PCT/US2012/066959, filed on Nov. 29, 2012 and published on Jun. 27, 2013 as International Patent Application Publication No. WO 2013/095881 A1, the entirety of which is incorporated herein by reference.

FIELD OF THE TECHNOLOGY

The present technology relates to a radiator assembly for a vehicle.

BACKGROUND

Internal combustion engines operate by combusting a mixture of fuel and air inside one or more combustion chambers. The combustion process generates a considerable amount of heat causing the engine and connected components to become heated. In order to operate properly, the heated engine needs to be cooled. Although the engine can be air cooled, many engines are now liquid cooled. In liquid-cooled internal combustion engines, a coolant runs through the engine to absorb some of the heat generated by the engine. The hot coolant then runs through one or more radiators to be cooled. The cooled coolant is then returned to the engine and the cycle is repeated. In order to operate efficiently, the radiators need air to flow over them in order to absorb heat from the cooling liquid. In small vehicles, locating the radiators such that they have sufficient airflow can be challenging.

Therefore, there is a need for an arrangement of radiators that enables adequate supply of air for cooling the engine without significantly increasing vehicle size.

SUMMARY

It is an object of the present technology to ameliorate at least some of the inconveniences mentioned above.

In accordance with one aspect, there is provided a vehicle having a frame, a straddle seat supported by the frame, a left front wheel and a right front wheel and at least one rear wheel operatively connected to the frame. A motor is supported by the frame and operatively connected to at least one of the wheels. A front cowling assembly is supported by the frame. A storage bin is disposed at least in part inside the front cowling assembly. At least one radiator fluidly communicates with the motor for cooling the engine. At least a portion of at least one of the at least one radiator is longitudinally and vertically aligned with at least a portion of the storage bin.

In some implementations, at least a portion of the storage bin extends longitudinally forward of the one of the at least one radiator.

In some implementations, a projection of the storage bin onto a vertical plane containing a longitudinal centerline of the vehicle encompasses a projection of the radiator onto the vertical plane.

In some implementations, the at least one radiator includes a left radiator disposed at least in part on a left side of the storage bin and a right radiator disposed at least in part on a right side of the storage bin.

In some implementations, the storage bin includes a front wall. A left side wall extends rearwardly from a left side of the front wall. A right side wall extends rearwardly from a right side of the front wall. A rear wall is connected between rear ends of the left and right side walls. At least a portion of the rear wall is disposed laterally between the left and right radiators and longitudinally aligned with the left and right radiators.

In some implementations, at least a portion of the rear wall is disposed vertically higher than the left and right radiators.

In some implementations, an upper edge of the front wall is lower than an upper edge of the rear wall, and upper ends of the left and right radiators are disposed vertically lower than at least a portion of the upper edge of the front wall.

In some implementations, at least a portion of the left side wall extends rightwardly away from the rear wall towards the front wall, and at least a portion of the right side wall extends leftwardly away from the rear wall towards the front wall.

In some implementations, a coolant passage fluidly communicates the left radiator with the right radiator. The engine fluidly communicates with the left and right radiators via the coolant passage.

In some implementations, the coolant passage is disposed rearward of the storage bin.

In some implementations, the storage bin is disposed forward of the engine.

In some implementations, the at least one radiator is disposed forward of the engine.

In some implementations, the front cowling assembly includes a hood movable between an open position providing access to the storage bin and a closed position preventing access to the storage bin.

In some implementations, a first line bisecting an upper edge and a lower edge of the left radiator is inclined with respect to a vertical plane containing the longitudinal centerline of the vehicle, and a second line bisecting an upper edge and a lower edge of the right radiator is inclined with respect to the vertical plane.

In some implementations, the storage bin includes a left side wall disposed rightward of the left radiator and a right side wall disposed leftward of the right radiator. The first line being inclined leftwardly from the lower edge to the upper edge of the left radiator, at least a portion of the left side wall being inclined leftwardly away from a lower edge thereof toward an upper edge thereof. The second line is inclined rightwardly from the lower edge to the upper edge of the right radiator. At least a portion of the right side wall is inclined rightwardly away from a lower edge thereof toward an upper edge thereof.

In some implementations, at least a portion of the one of the at least one radiator is disposed within a cylinder circumscribing the front wheels, with the front wheels in a straight ahead orientation.

In some implementations, at least one fan is adapted to force air through the at least one radiator.

In some implementations, an inlet surface of the one of the at least one radiator is disposed in a direction normal to a longitudinal centerline of the vehicle.

In some implementations, a left front suspension assembly connects the left front wheel to the frame and a right front suspension assembly connects the right front wheel to the frame. A left fan is disposed longitudinally between left radiator and the left suspension assembly and adapted to force air through the left radiator. A right fan is disposed longitudinally between the right radiator and the right suspension assembly and adapted to force air through the right radiator.

In some implementations, a left front suspension assembly connects the left front wheel to the frame and a right front suspension assembly connects the right front wheel to the frame. An output shaft is operatively connected to the motor and defines an output shaft axis extending laterally. The output shaft axis is disposed longitudinally rearward of the left and right front suspension assemblies. A steering assembly includes a handlebar operatively connected to the left front wheel and the right front wheel for steering the vehicle. The handlebar is disposed rearward of the output shaft axis.

In some implementations, a left front suspension assembly connects the left front wheel to the frame and a right front suspension assembly connects the right front wheel to the frame. An output shaft is operatively connected to the motor and defines an output shaft axis extending laterally. The output shaft axis is disposed longitudinally rearward of the left and right front suspension assemblies. A left footrest and a right footrest are disposed vertically lower than the seat and longitudinally rearward of the output shaft axis.

In some implementations, a left front suspension assembly connects the left front wheel to the frame and a right front suspension assembly connects the right front wheel to the frame. An output shaft is operatively connected to the motor and defines an output shaft axis extending laterally. The output shaft axis is disposed longitudinally rearward of the left and right front suspension assemblies. At least a portion of one of the at least one radiator is disposed vertically lower than the output shaft axis.

In some implementations, a power steering motor is operatively connected to the left and right front wheels, the power steering motor being disposed longitudinally rearward of the one of the at least one radiator.

For the purpose of this application, terms related to spatial orientation such as downwardly, rearwardly, forward, front, rear, left, right, above and below are as they would normally be understood by a driver of the vehicle sitting thereon in a normal driving position. Definitions of terms provided herein take precedence over definitions of the same terms that may be provided in any of the documents incorporated herein by reference.

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11A is a perspective view, taken from a front, right side, of the front suspension assembly connected to a frame of the vehicle of FIG. 1;

DETAILED DESCRIPTION

The present description is provided with respect to a three-wheel vehicle 10. However, it should be understood that other types of straddle-type vehicles such as, for example, three or four wheel all-terrain vehicles are also contemplated. Aspects of the technology could also be applied to two-wheel straddle seat vehicles such as motorcycles.

Figure 1:
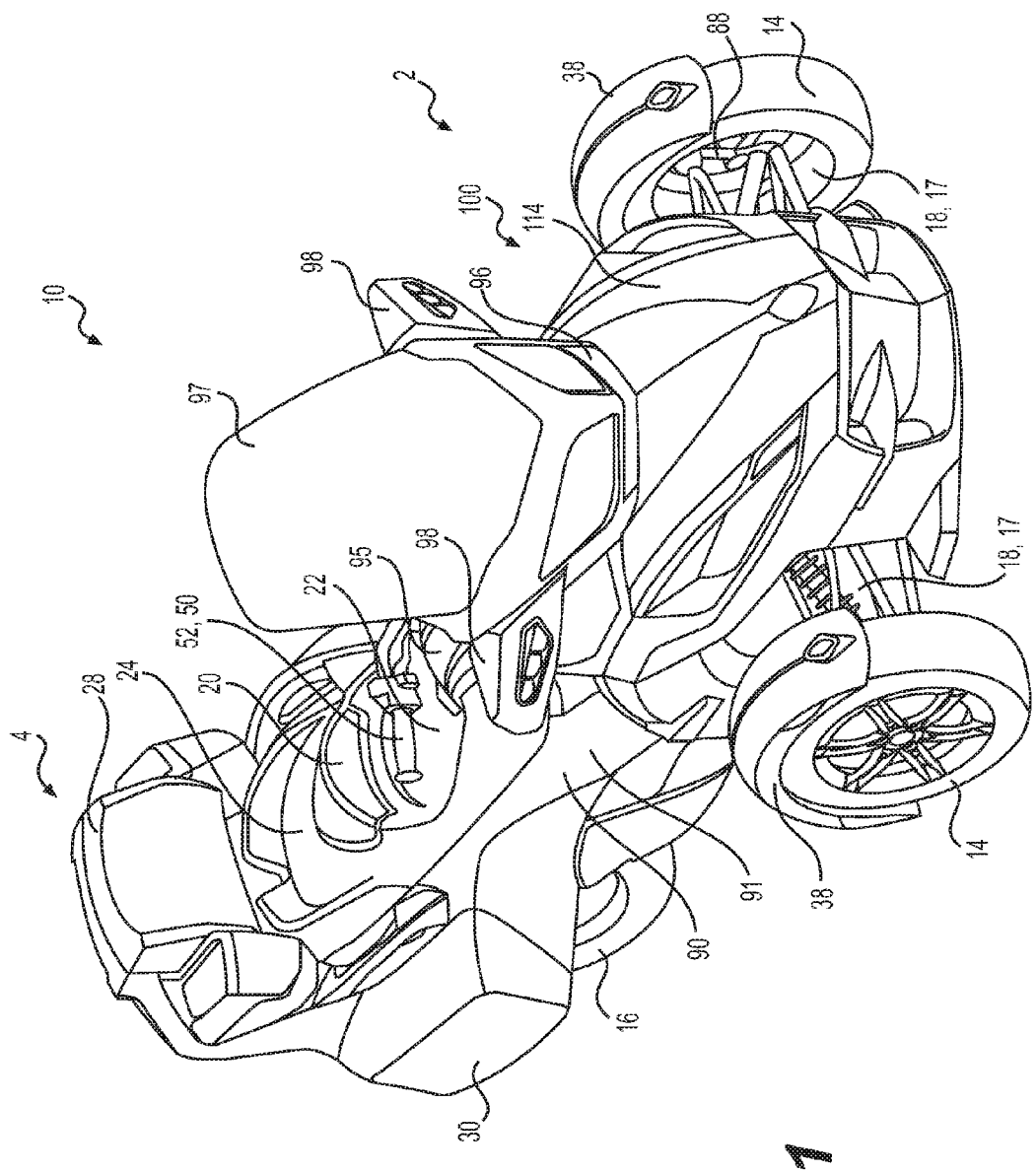
FIG. 1 is a perspective view taken from a front, right side of a three-wheel vehicle.
Figure 2:
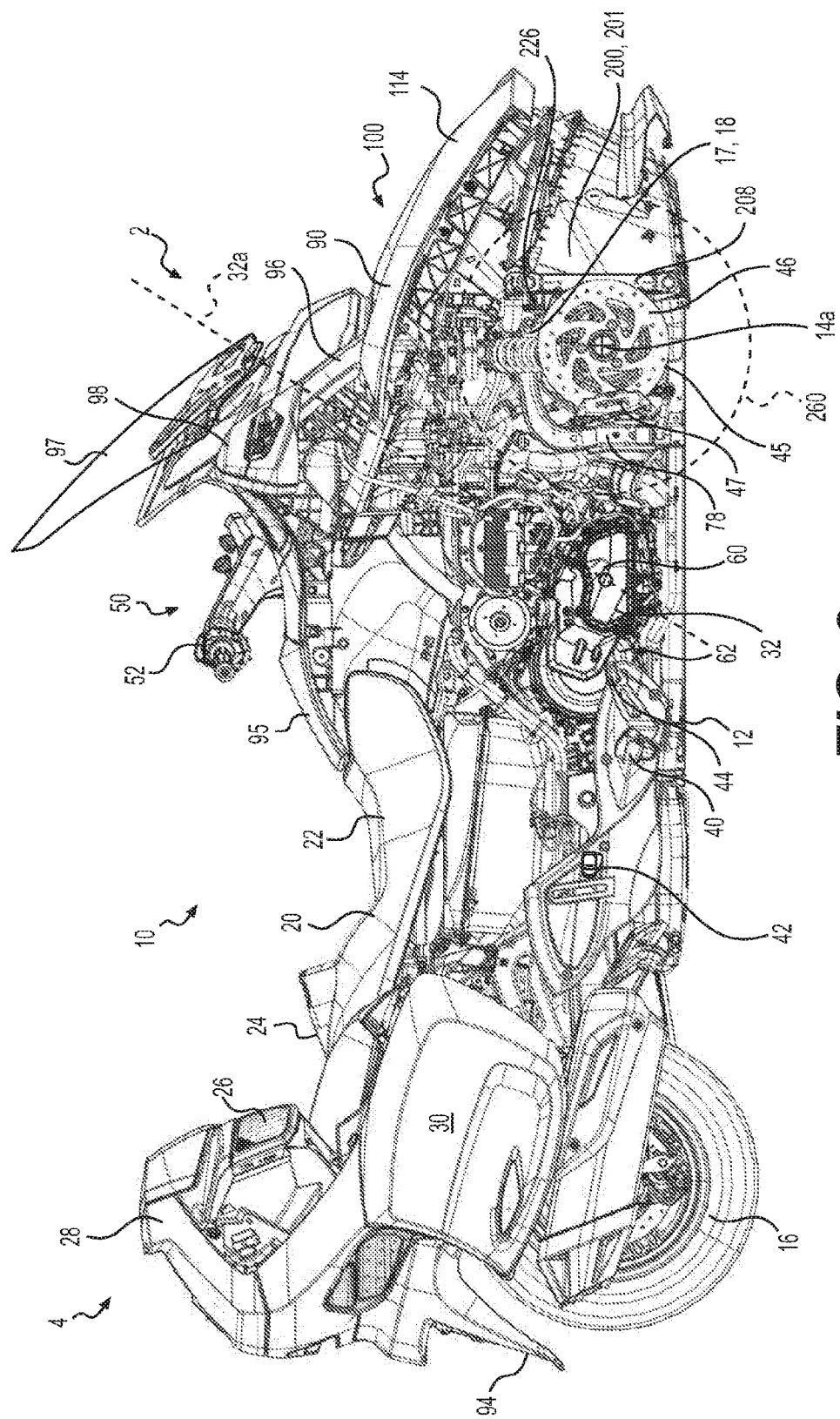
FIG. 2 is a right side elevation view of the vehicle of FIG. 1 with the front wheels and some of the side cowling panels removed to show the internal components.
Figure 3:
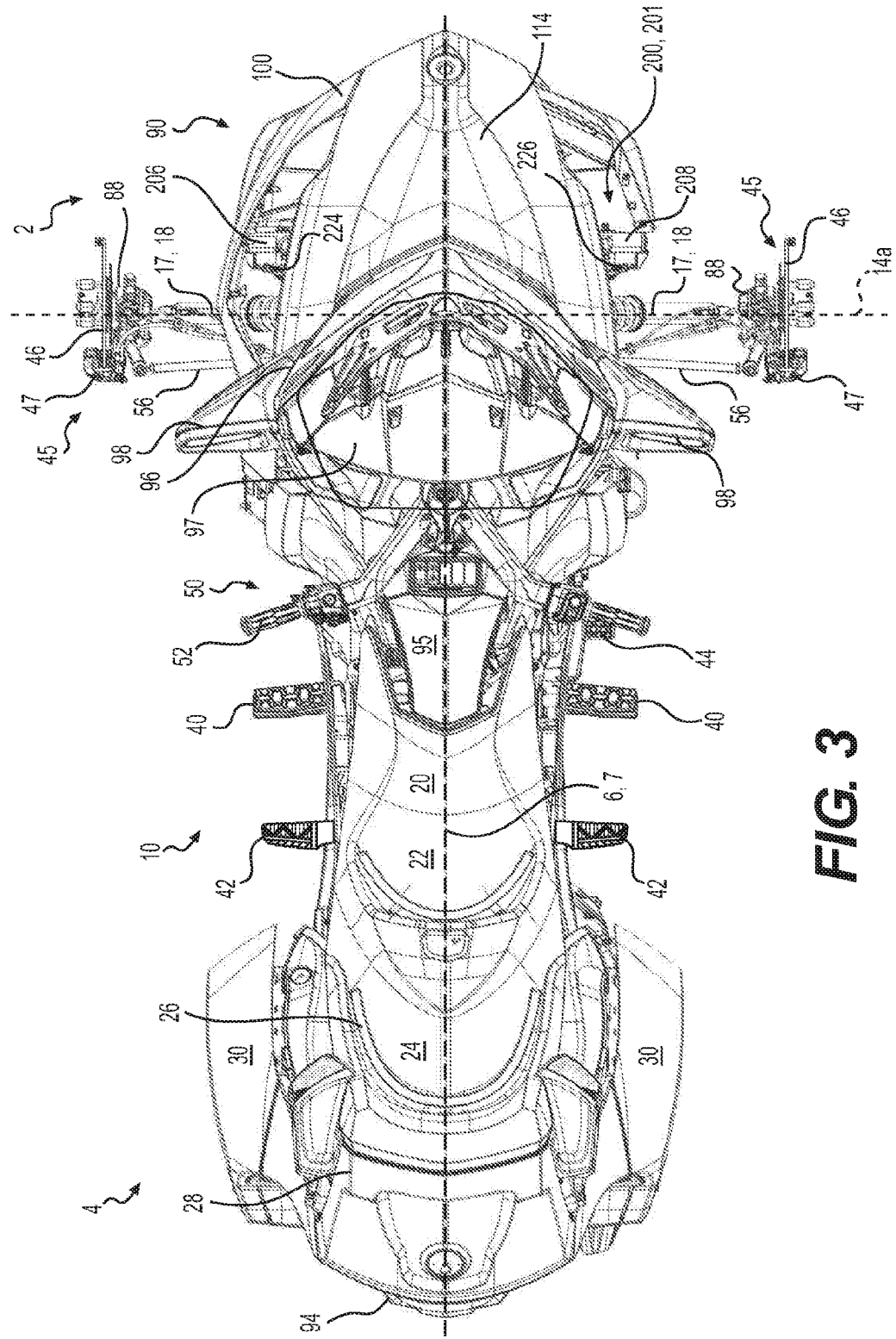
FIG. 3 is a top plan view of the vehicle of FIG. 2.

With reference to FIGS. 1 to 3, a vehicle 10 has a front portion 2 and a rear portion 4 defined consistently with the forward travel direction of the vehicle 10. The vehicle 10 has a frame 12 (indicated in FIG. 2) which defines a longitudinal centerline 6 and a longitudinal centerplane 7 (vertical plane containing the longitudinal centerline 6). The vehicle 10 is a three-wheel vehicle 10 including a left front wheel 14, a right front wheel 14 and a single rear wheel 16. It is however contemplated that the vehicle 10 could have more than one rear wheel 16. A front suspension assembly 17 connects the front wheels 14 to the frame 12. A rear suspension assembly (not shown) connects the rear wheel 16 to the frame 12. The front wheels 14 are equally offset from the longitudinal centerline 6 in the lateral direction, and the rear wheel 16 is aligned with the longitudinal centerline 6. The left and right front wheels 14 and the rear wheel 16 each have a tire secured thereto. It is contemplated however that the front wheels 14 or the rear wheel 16 could have more than one tire secured thereto.

A motor 32 (FIG. 2) is operatively connected to the rear wheel 14 to drive the rear wheel 16. It is contemplated that the motor 32 could be connected to the front wheels 14 instead of, or in addition to, the rear wheel 16. In the illustrated implementation of the vehicle 10, the motor 32 is in the form of an internal combustion engine. It is contemplated that the motor 32 could be other than an internal combustion engine. For example, the motor 32 could be an electric motor, a hybrid, or the like. Although, the motor 32 will be referred to as an engine 32 hereinafter, it should be understood that the description below is not to be limited to an internal combustion engine.

The vehicle 10 is a straddle-type vehicle having a straddle seat 20 along the longitudinal centerline 6 and supported by the frame 12. The straddle seat 20, adapted to accommodate two adult-sized riders, includes a forward seat portion 22 for the driver and a rear seat portion 24 for a passenger. It is contemplated that the three-wheel vehicle 10 could not have the rear seat portion 24, and could be adapted to accommodate only the driver. A central cargo box 28 and a backrest 26 are provided behind the rear seat portion 24. A pair of side cargo boxes 30 is mounted to a rear left and rear right side of the three-wheel vehicle 20 below the rear seat portion 24. It is contemplated that the cargo boxes 28, 30 and the backrest 26 could be omitted.

A pair of driver footrests 40 (shown in FIGS. 2 and 3), in the form of footpegs, is provided, one footrest 40 on either side of the vehicle 10 below the first portion 22 of the straddle seat 20 for a driver to rest his feet thereon. Similarly a pair of passenger footrests 42 (shown in FIGS. 2 and 3), in the form of foot pegs, is also provided, one footrest 42 on either side of the vehicle 10 below the second portion 24 of the straddle seat 12 for a passenger to rest his feet thereon. A brake actuator, in the form of a foot brake lever 44, is provided on a right side of the vehicle 10 below the first portion 22 of the straddle seat 20 for braking the vehicle 10. The foot brake lever 44 is operatively connected to a brake 45 provided on each of the two front wheels 14. The brake 45 includes a rotor 46 mounted onto the wheel hub and a caliper 47 straddling the rotor 46.

Figure 12:
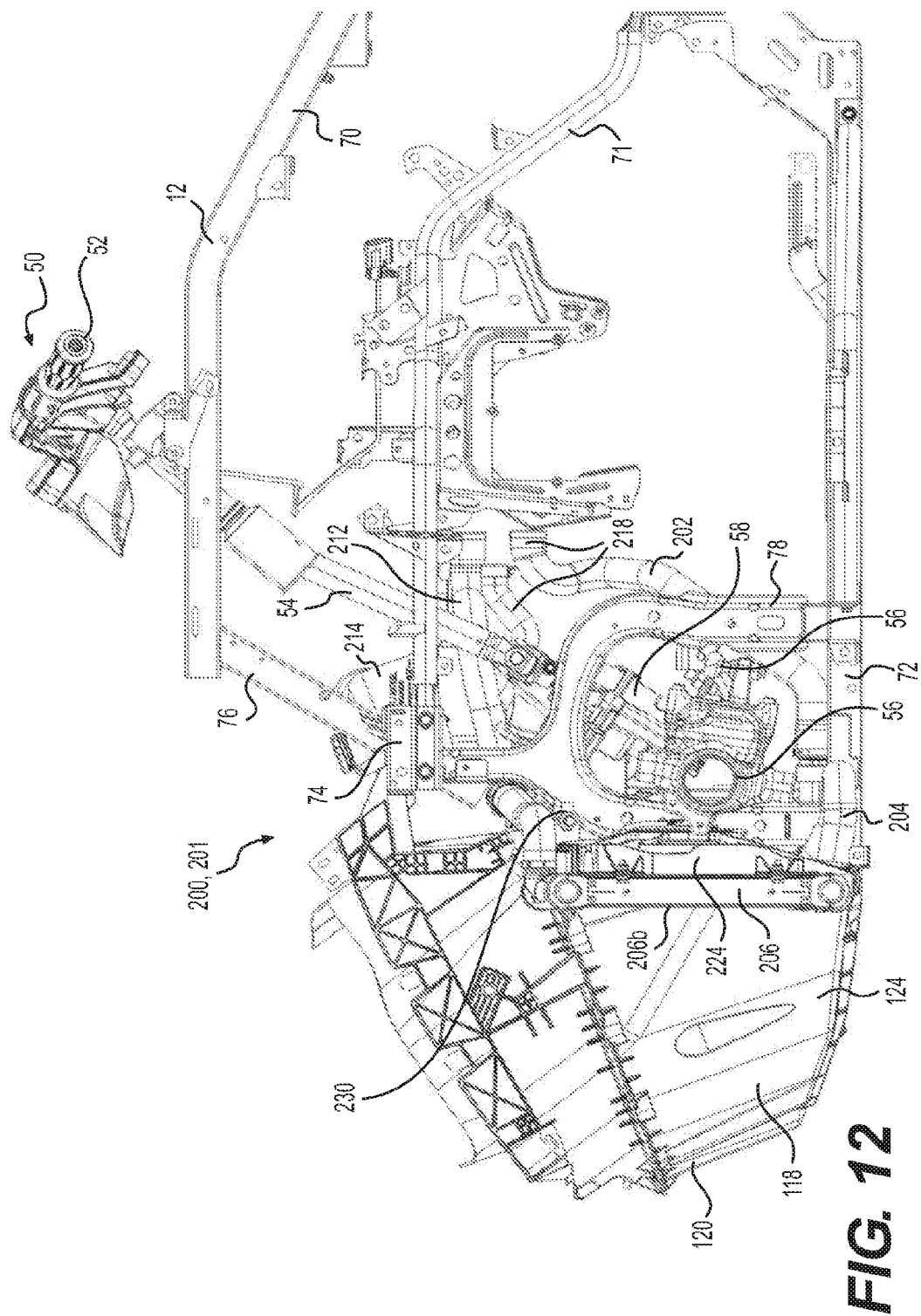
FIG. 12 is a left side elevation view of a portion of the vehicle of FIG. 2 showing the frame, a steering assembly, the radiator assembly and the storage bin.
Figure 13:
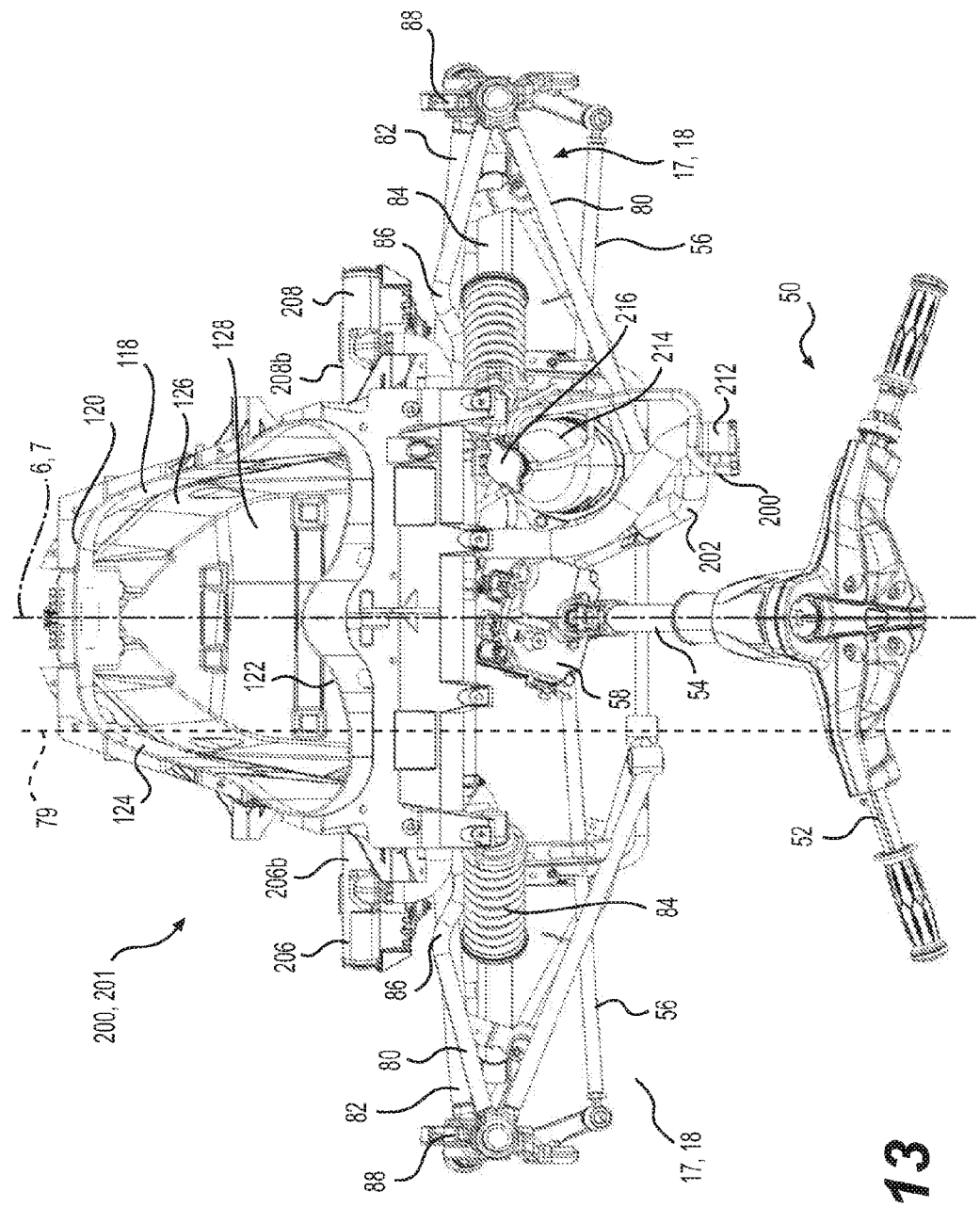
FIG. 13 is a top plan view of the vehicle portion of FIG. 12 with the frame removed for clarity.

A steering assembly 50 is disposed forwardly of the straddle seat 20 to allow a driver to steer the two front wheels 14. As best seen in FIGS. 12 and 13, the steering assembly 50 includes a handlebar 52, a steering column 54 and steering linkages 56 connected to the front wheels 14 such that turning the handlebars 52 turns the steering column 54 which, through the steering linkages 56, turns the wheels 14. In the illustrated implementation of the vehicle 10, the steering assembly 50 includes a power steering unit 58 to facilitate steering of the vehicle 10. The power steering unit 58 includes an electronic sensor (not shown) which senses the position of the steering column 54 and a motor 59 (FIG. 14) operatively connected to the steering linkages 56 to turn the wheels 14 based upon the position of the handlebar 52. The frame 12 supports and houses the powerpack of the vehicle 10, including the motor 32 (which is an internal combustion engine in the illustrated implementation of the vehicle 10), and other components connected thereto, such as a transmission (not shown), battery (not shown) and the like. The engine 32 is located between the straddle seat 20 and front wheels 14. The engine 32 is an inline three-cylinder four-stroke internal combustion engine, but it is contemplated that other types of internal combustion engines could be used. The engine 32 has a crankshaft (not shown), generally referred to as an output shaft. The output shaft rotates about an output shaft axis 60 (FIG. 2) disposed horizontally and perpendicular to the longitudinal centerline 6. It is contemplated that the output shaft could be a shaft driven by the crankshaft. The cylinders define a cylinder axis 32a (FIG. 2) passing through a center thereof and the output shaft axis 60. The engine 32 and the output shaft axis 60 are disposed rearward of the front suspension assembly 17. The output shaft axis 60 of the engine 32 is located forward of the driver footpegs 40 and the foot brake lever 44. It is contemplated that the output shaft axis 60 could be disposed longitudinally aligned with the driver footpegs 40, or longitudinally rearward thereof.

The rear wheel 16 is operatively connected to the output shaft of the engine 32 through a transmission 62 (FIG. 2).

Fairings 90 enclose and protect the internal components of the three-wheel vehicle 10, including the engine 32. The fairings 90 are connected to the vehicle frame 12. The fairings 90 include side panels 91 disposed below and on each side of straddle seat 20, a rear deflector 94 extending over the rear wheel 16, and an upper fairing 95 extends forwardly of the straddle seat 20 and downwardly on both sides of vehicle 10 to cover the top portion of the engine 32. Fairings 90 also include an upper segment 96 to which is mounted a windshield 97, a pair of side view mirrors 98 and a dashboard panel (not shown) for mounting various gauges and indicators. A front cowling assembly 100 of the fairings 90 encloses a forward portion of the engine 32 and an engine cooling system 200 will be described below in more detail.

With reference to FIG. 11A to 12, the frame 12 includes an upper member 70, a lower member 72, a rear member 73, a lower forward member 74 and an upper forward member 76. The upper member 70 and the lower member 72 extend longitudinally along the longitudinal centerline 6. The lower member 72 extends generally horizontally. The upper member 70 extends generally horizontally in a front portion, then downwardly and rearwardly in a middle portion. A rear portion of the upper member 70 is disposed longitudinally rearwards of the lower member and extends in an upwardly in a rearwardly direction. The rear member 73 extends upwardly and rearwardly from the rear end of the lower member 72 to the rear portion of the upper member 70. The upper forward member 76 extends downwardly and forwardly from the front end of the upper member 70. The horizontally extending lower forward member 74 is connected to the lower end of the upper forward member 76. The lower forward member 74 extends laterally outwardly on either side of the upper forward member 76. A left suspension module 78, having an inverted U-shape, is connected to the left end of the lower forward member 74 and extends downwardly therefrom. A right suspension module 78, having an inverted U-shape, is connected to the right end of the lower forward member 74 and extends downwardly therefrom. The vehicle frame 12 also has a strut 71 extending diagonally from the upper forward member 76 to the rear member 73 for reinforcement and attachment of various components of the vehicle 10.

With reference to FIGS. 5 to 13, the front suspension assembly 17 includes a left front suspension assembly 18 connected to the left suspension module 78 and a right front suspension assembly 17 connected to the left suspension module 78. The left front wheel 14 is rotatably connected to the frame 12 via the left front suspension assembly 18. The right front wheel 14 is rotatably connected to the frame 12 via the right front suspension assembly 17. As the left suspension assembly 18 is a mirror image of the right suspension assembly 18, only the left suspension assembly 18 will be described below in detail.

The left front suspension assembly 18 is a double A-arm type suspension, also known as a wishbone suspension. The left front suspension assembly 18 includes a left upper A-arm 80, a left lower A-arm 82 and a left shock absorber 84.

Each A-arm 80, 82 is formed of a front member and a rear member connected together at their left (outer) ends and spaced apart at their right (inner) ends. The outer end of the left upper A-arm 80 is connected to the upper end of a wheel knuckle 88 of the left wheel 14. The inner end of the front member of the left upper A-arm 80 is connected to the front leg of the U-shaped front suspension module 78 of the frame 12. The inner end of the rear member of the left upper A-arm 80 is connected to the rear leg of the U-shaped front suspension module 78 of the frame 12.

The outer end of the left lower A-arm 82 is connected to a lower end of the wheel knuckle 88 of the left wheel 14. The inner end of the front member of the left lower A-arm 82 is connected to the front leg of the U-shaped front suspension module 78 below the front member of the left upper A-arm. The inner end of the rear member of the left lower A-arm 82 is connected to the rear leg of the U-shaped front suspension module 78 of the frame 12 below the rear member of the left upper A-arm.

Figure 5:
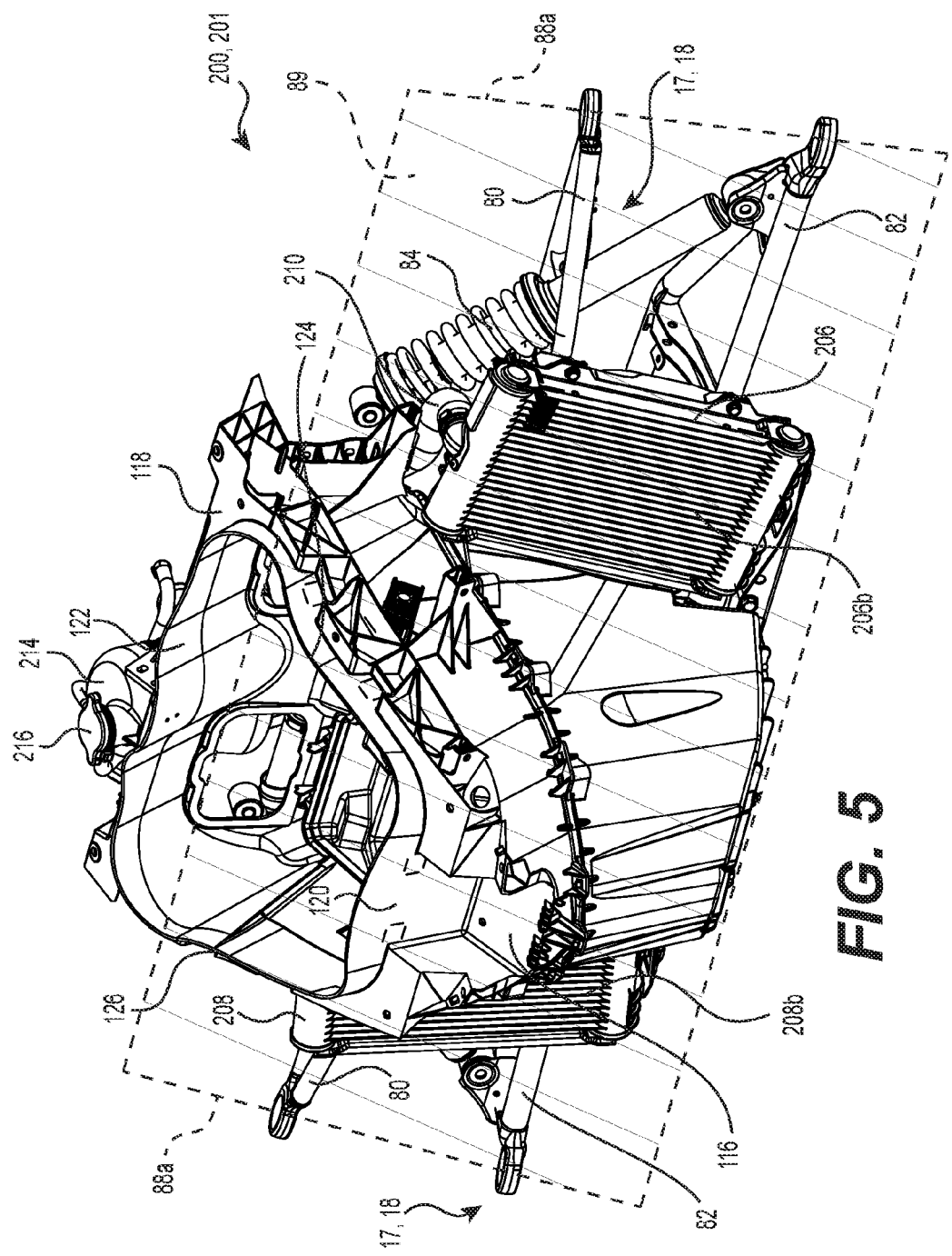
FIG. 5 is a perspective view taken from a front, left side of the radiator assembly, a storage bin and a portion of a front suspension assembly of the vehicle of FIG. 1.

A left steering pivot axis 88a is defined by a generally vertical line passing through the outer ends of the upper and lower A-arms 80, 82 to which the knuckle 88 of the left wheel 14 is connected. Similarly, a right steering pivot axis 88a is defined by the upper and lower A-arms of the right front suspension assembly 18. The left and right steering pivot axes 88a are inclined rearwardly from the lower A-arm 82 to the upper A-arm 80 (as can be seen best in FIGS. 9 and 10). The left and right steering pivot axes 88a are contained in a plane 89 (FIGS. 5, 9 and 10).

Figure 14:
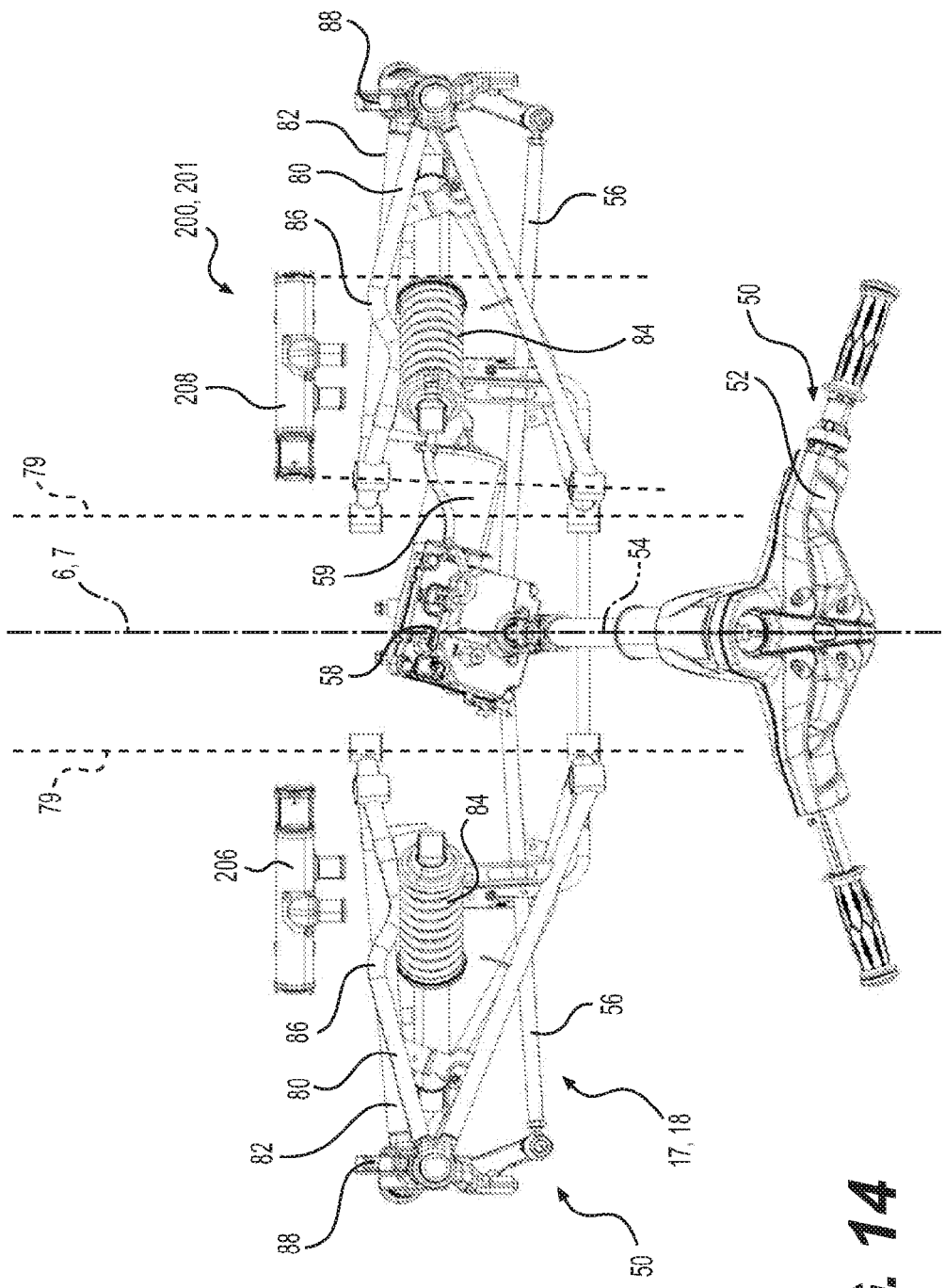
FIG. 14 is a top plan view of the vehicle portion of FIG. 12 with the storage bin removed for clarity.

With reference to FIGS. 12 to 14, the power steering unit 58 is disposed laterally between the left and right suspension assemblies 18. The power steering unit 58 is disposed longitudinally between front and rear members of the left upper A-arm 80 (also between the front and rear members of the right upper A-arm 80 since it is a mirror image of the left upper A-arm 80). The power steering unit 58 is disposed vertically higher than the lower A-arm 82 of the left suspension assemblies 18 (or of the right suspension assembly 18).

Figure 9:
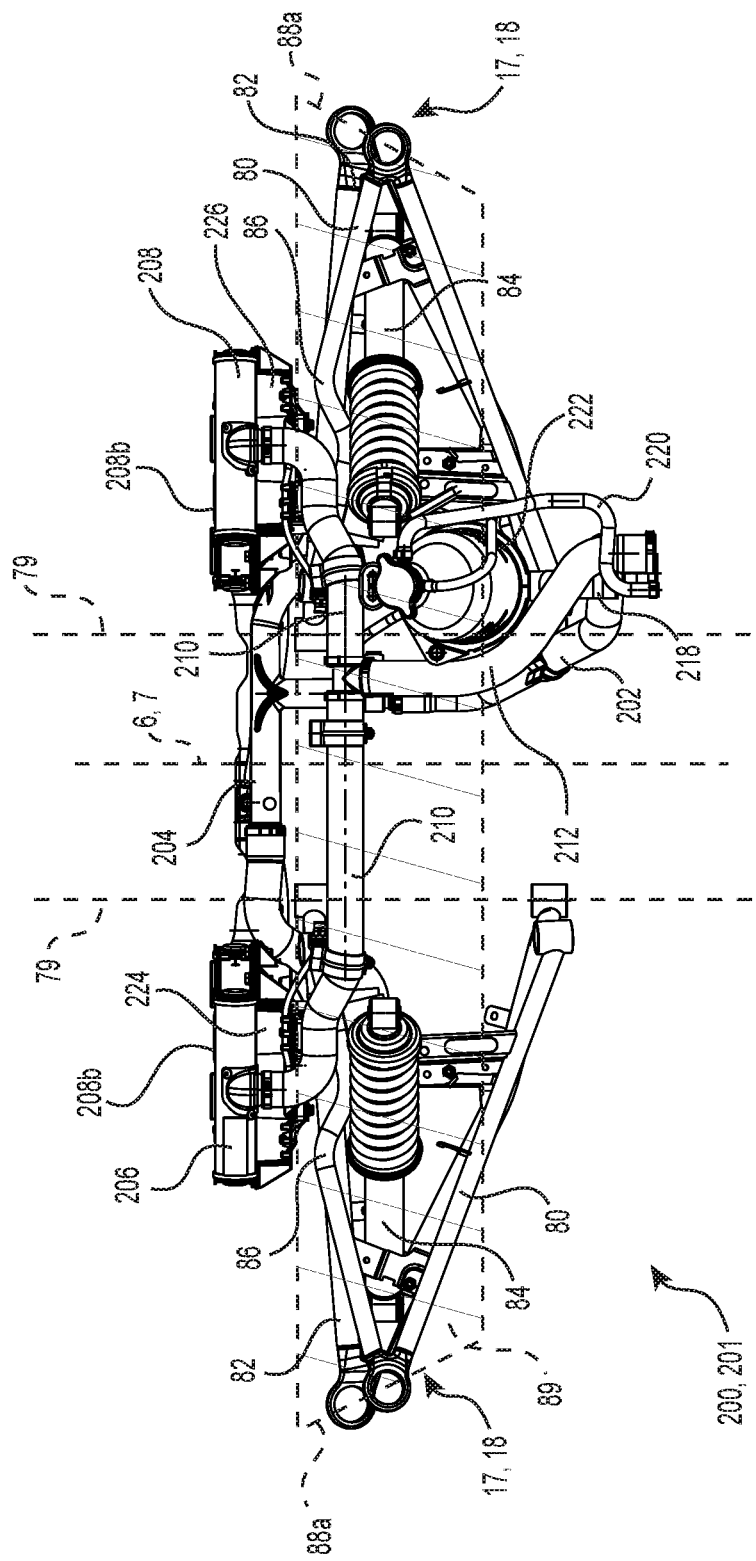
FIG. 9 is a top plan view of the radiator assembly and front suspension assembly of FIG. 8.
Figure 10:
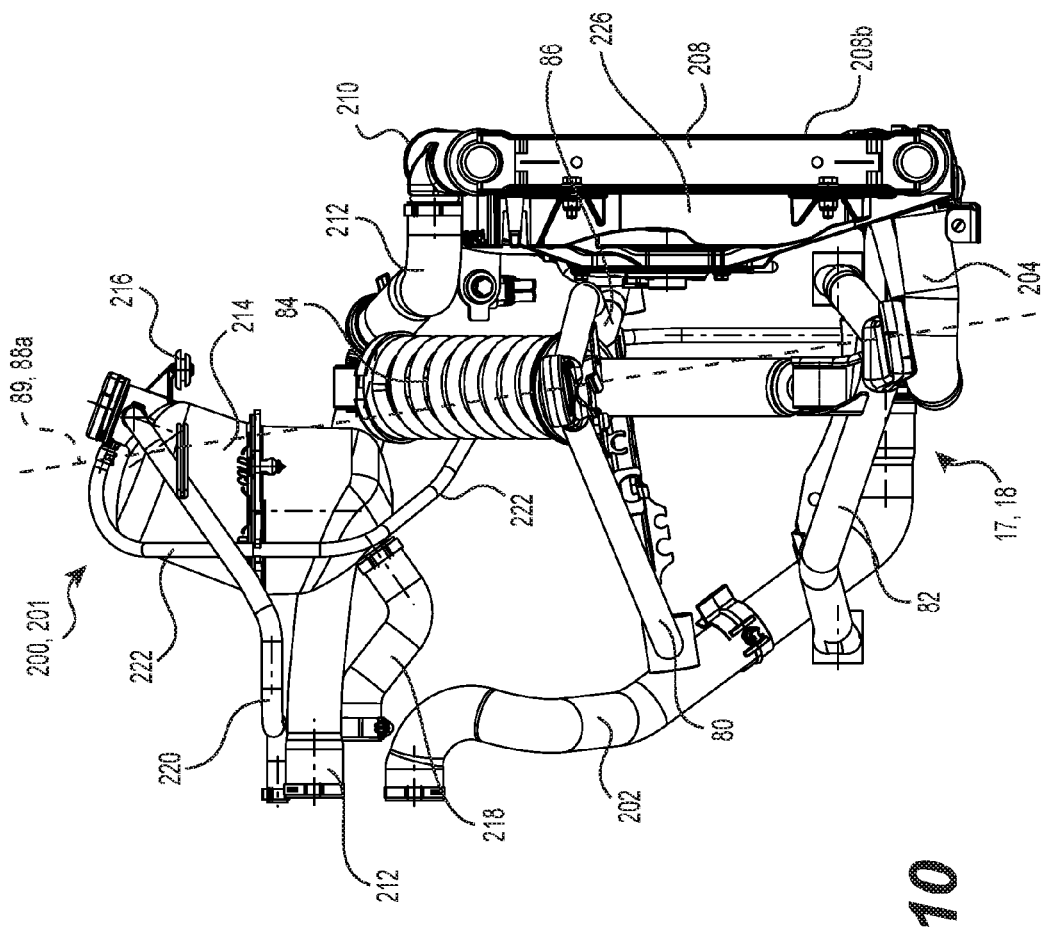
FIG. 10 is a right side elevation view of the radiator assembly and front suspension assembly of FIG. 8.

As can be seen in FIGS. 9 and 13, the rear member of the left upper A-arm 80 extends rearwardly from its wheel knuckle 88 to the left suspension module 78. It is contemplated that the rear member of the left upper A-arm 80 could not extend rearwardly. The front member of the left upper A-arm 80 extends forwardly from its left end toward its right end. It is contemplated that the front member of the left upper A-arm 80 could not extend forwardly from its left end. A middle portion 86 (FIG. 9) of the upper A-arm front member bends rearwardly toward its right end. The front member of the left upper A-arm 80 extends rearwardly from its right end connected to the left suspension module 78. It is contemplated that the upper A-arm front member could not have the bent middle portion 86 but be straight along its entire length. It is contemplated that the A-arms 80, 82 could be configured differently than as shown herein.

The shock absorber 84 includes a hydraulic damper surrounded by a coil spring. The lower end of the shock absorber 84 is connected to the left end of the lower A-arm 82. The shock absorber 84 extends upwards and rightwards from the left end of the left lower A-arm 82, passing between the front and rear members of the upper A-arm 82. An upper end of the shock absorber 84 is connected to the lower forward member 74 of the frame 12 above the left suspension module 78.

It is contemplated that the left shock absorber 84 could be connected to the upper A-arm 80 instead of the lower A-arm 82. It is contemplated that the left and right front suspension assemblies 18 could have only one A-arm. It is further contemplated that the front suspension assembly could be constructed of members other than A-arms 80, 82 as shown herein.

Turning now to FIGS. 4 to 7, the front cowling assembly 100 includes a lower cowling 104, left and right upper cowlings 106, 108, left and right intake trims 110, 112, and a hood 114. In the illustrated implementation of the front cowling assembly 100, each of the cowlings 104, 106, 108, 110, 112, 114 is detachably connected to one or more of the other cowlings 104, 106, 108, 110, 112, 114 and/or other parts of the vehicle 10. It is also contemplated that one or more of the cowlings 104, 106, 108, 110, 112, 114 could be fixedly connected to one or more of the other cowlings 104, 106, 108, 110, 112, 114 and/or integrally formed therewith. The front cowling assembly 100 defines an internal volume inside which portions of a cooling system 200 including a radiator assembly 201, portions of an air intake system (not indicated), and a storage bin 118 are enclosed. In the illustrated implementation of the vehicle 10, the cooling system cools the engine 32. It is contemplated that the cooling system 200 could be used to cool a motor 32, other than an internal combustion engine, for example, an electric motor, a hybrid, or the like. It is also contemplated that the cooling system 200 could be used to cool portions of the powerpack of the vehicle 10, such as the transmission (not shown), the battery (not shown), and the like.

The lower cowling 104 extends around a front of the vehicle 10 and is connected to the storage bin 118 by a plurality of fasteners. In the illustrated implementation of the front cowling assembly 100, the lower cowling 104 is connected to the frame 12 via the storage bin 118 but it is contemplated that the front cowling assembly 100 could be connected directly to the frame 12, or connected to the frame 12 via another component of the vehicle 10.

The left upper cowling 106 is connected to the storage bin 118 and to the left upper edge of the lower cowling 104 by a plurality of fasteners. The right upper cowling 108 is connected to the storage bin 118 and to the right upper edge of the lower cowling 104 by a plurality of fasteners. The left and right upper cowlings 106, 108 each define a recess inside which a headlight 102 is received. The left and right intake trims 110, 112 respectively define air inlets 144 and 146. The air inlet 144 directs air to the air intake system connected to the engine 32. The intake trims 110, 112 are connected to outer surfaces of upper portions of the lower cowling 104. Upper portions of the left and right intake trims 110, 112 overlap a front portion of their corresponding left and right cowlings 106, 108.

The hood 114 extends between inner edges of the left and right upper cowlings 106. The hood 114 is connected to the storage bin 118, at the front thereof, by a hinge (not shown), and at a rear thereof by a lock (not shown). The hinge is received in a recess 116 shown in FIGS. 5 and 6. The hood 114 can be pivoted to an open position to provide access to the storage bin 118. It is contemplated that the hood 114 could be hinged at a rear thereof. It is also contemplated that the hood 114 could be removable.

The above-described arrangement is only one possible implementation of a front cowling assembly 100. For example, it is contemplated that the left and right upper cowlings 106, 108 could be integrally formed as a single generally U-shaped upper cowling. In another example, the elements 104, 106, 108, 110 and 112 of the cowling assembly are all integrally formed. In another example, the intake trims 110, 112 are integrally formed with the lower cowling 104 or with their corresponding upper cowlings 106, 108. It is also contemplated that each one of the elements 104, 106, 108, 110, 112 and 114 could each be made of more than one part.

Figure 4:
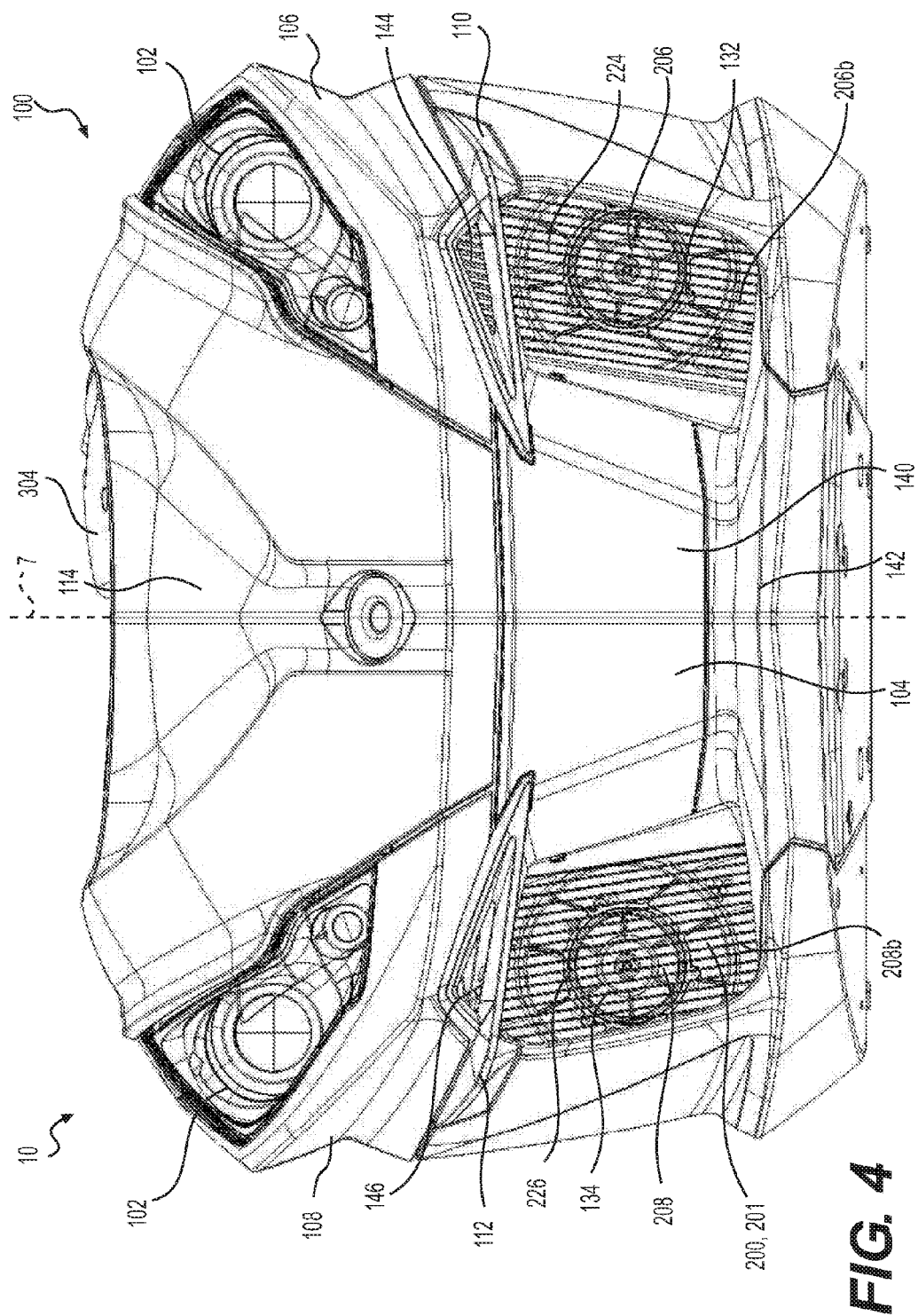
FIG. 4 is a front elevation view of a front cowling assembly of the vehicle of FIG. 1.

The storage bin 118 is disposed under the hood 114 when the hood 114 is in the closed position illustrated in FIGS. 2 to 4. The storage bin 118 is fastened to the upper cowlings 106, 108 and the lower forward member 74 of the frame 12. The storage bin 118 is open at a top thereof and has a front wall 120, a rear wall 122, a left side wall 124, a right side wall 126, and a bottom 128 (FIG. 14). The upper edge of the front wall 120 is disposed vertically lower than the upper edge of the rear wall 122. A central portion of the rear wall 122 curves forward towards the front wall 120. The upper edge of the left side wall 124 extends continuously upwards from the front wall 120 to the rear wall 124. The left wall 124 extends leftwardly from the front wall 120 to the rear wall 122. The left wall 124 flares out leftwardly just before connecting with the rear wall 122. The right wall is a mirror image of the left wall 124 and will thus not be described herein in detail. It is contemplated that the storage bin 118 could be shaped differently than as shown herein.

The radiator assembly 201 enclosed in the front cowling assembly 100 includes a left radiator 206 and a right radiator 208 disposed inside the front cowling assembly 100 at the rear of the lower cowling 104.

The lower cowling 104 defines a left inlet 132 and a right inlet 134 on opposite sides of the longitudinal centerline 6 forwardly of the radiators 206, 208. The air inlets 132, 134 face generally toward the front of the vehicle 10 such that when the vehicle 10 moves forward, air flowing parallel to the longitudinal centerline 6 relative to the vehicle 10 enters into the air inlets 132, 134 and through the corresponding left and right radiators 206, 208 into the space enclosed by the front cowling assembly 100. The central portion 140 of the lower cowling 104 is curved and is provided with a lower lip 142 such that air coming into contact with the central portion 140 as the vehicle 10 moves forward is directed toward the air inlets 132, 134. In order to create an air flow over the radiators 206, 208 when the vehicle 10 is not moving with the engine 32 in operation or moving at low speeds, the radiators 206, 208 are respectively provided with fans 224, 226. The left fan 224 is disposed rearward of the left radiator 206 and the right fan 226 is disposed rearward of the right radiator 208. It is contemplated that the fans 224, 226 could be disposed forward of the corresponding radiator 206, 208. The fans 224, 226 act as impellers drawing cool air from outside the cowling assembly 100 and forcing (pushing or pulling) the cool air through the radiators 206, 208.

Turning now to FIGS. 5 to 10 and 13 to 14, the cooling system 200 of the vehicle 10 includes the radiator assembly 201. As mentioned above, although the cooling system 200 described herein is used for cooling the engine 32, it is contemplated that the cooling system 200 could be used for cooling a motor 32 of the vehicle 10 and/or other components connected thereto (i.e. the powerpack).

The engine 32 is liquid-cooled. Liquid coolant flows through passages formed in the engine 32 to absorb heat from the engine 32, thereby cooling the engine 32. It is also contemplated that the coolant could be a fluid in a gaseous state. From the engine 32, the hot coolant flows in a hose 202. The hose 202 is connected to a hose 204 where the hot coolant is split and flows through the hose 204 to the bottom of left and right radiators 206, 208. The coolant then flows upwardly through conduits in the radiators 206, 208. Air flowing through the radiators 206, 208 absorbs heat from the coolant, thereby cooling the coolant. The cooled coolant then flows from the top of each radiators 206, 208 into a hose 210 connected to the top of the radiator 206, 208. The two flows of coolant in the left and right hoses 210 flowing respectively from the left and right radiators 206, 208 then merge into a hose 212 connected to both of the left and right hoses 210. The cooled coolant then flows through the hose 212 and is returned to the engine 32 to cool the engine 32. One or more pumps (not shown) cause the coolant to flow through the above-described circuit. The pumps can be electrical or mechanically driven by the engine 32.

A coolant tank 214 is provided behind the storage bin 118 on a right side of the longitudinal centerline 130 of the vehicle 10. The coolant tank 214 can be filled with coolant by removing a cap 216 of the coolant tank 214. A hose 218 (best seen in FIG. 10) connects the coolant tank 214 to the engine 32 such that the coolant tank 214 can receive and supply coolant from and to the engine 32 should there be an insufficient amount of coolant flowing through the engine 32 or an expansion of the coolant flowing therethrough. A hose 220 connects the coolant pump disposed in an upper portion of the engine 32 to the upper portion of the coolant tank 214 for bleeding air out of the coolant flowing through the cooling system 200. A hose 222 is connected to the coolant tank 214 via a pressure release valve for releasing pressure in the coolant tank 214. When the pressure in the coolant tank 214 exceeds a predetermined level set by the pressure release valve, coolant liquid flows out of the coolant tank 214 via the hose 222 thereby reducing pressure in the coolant tank 214. When the pressure exceeds the predetermined level.

Although, in the implementation of the cooling system 200 shown herein, the radiators 206, 208 are connected in parallel to the engine 32, it is contemplated that the radiators 206, 208 may be connected in series with each other and the engine 32. It is also contemplated that the radiators 206, 208 could be connected to the engine 32 in parallel and with separate pumps so as to operate independently. It is contemplated that one of the two radiators 206, 208 could be used to cool the engine's lubricant, while the other is used to cool the engine's coolant liquid. It is contemplated that the vehicle 10 could have only one of the radiators 206, 208.

With reference to FIGS. 2 to 10, 12 and 13, the arrangement of the radiators 206, 208 will now be described.

The left radiator 206 is disposed on the left side of the longitudinal centerline 6 in front of the left front suspension assembly 18. The right radiator 208 is disposed on the right side of the longitudinal centerline 6 in front of the right front suspension assembly 18.

Each of the left and right radiators 206, 208 is generally rectangular and has an upper edge, a lower edge, a left edge and a right edge. A line 206a (FIG. 6) bisects the upper and lower edges of the left radiator 206. A line 208a (FIG. 6) bisects the upper and lower edges of the right radiator 208. The left radiator has a front surface or inlet surface 206b. The right radiator 208 has a front surface or inlet surface 208b.

Figure 6:
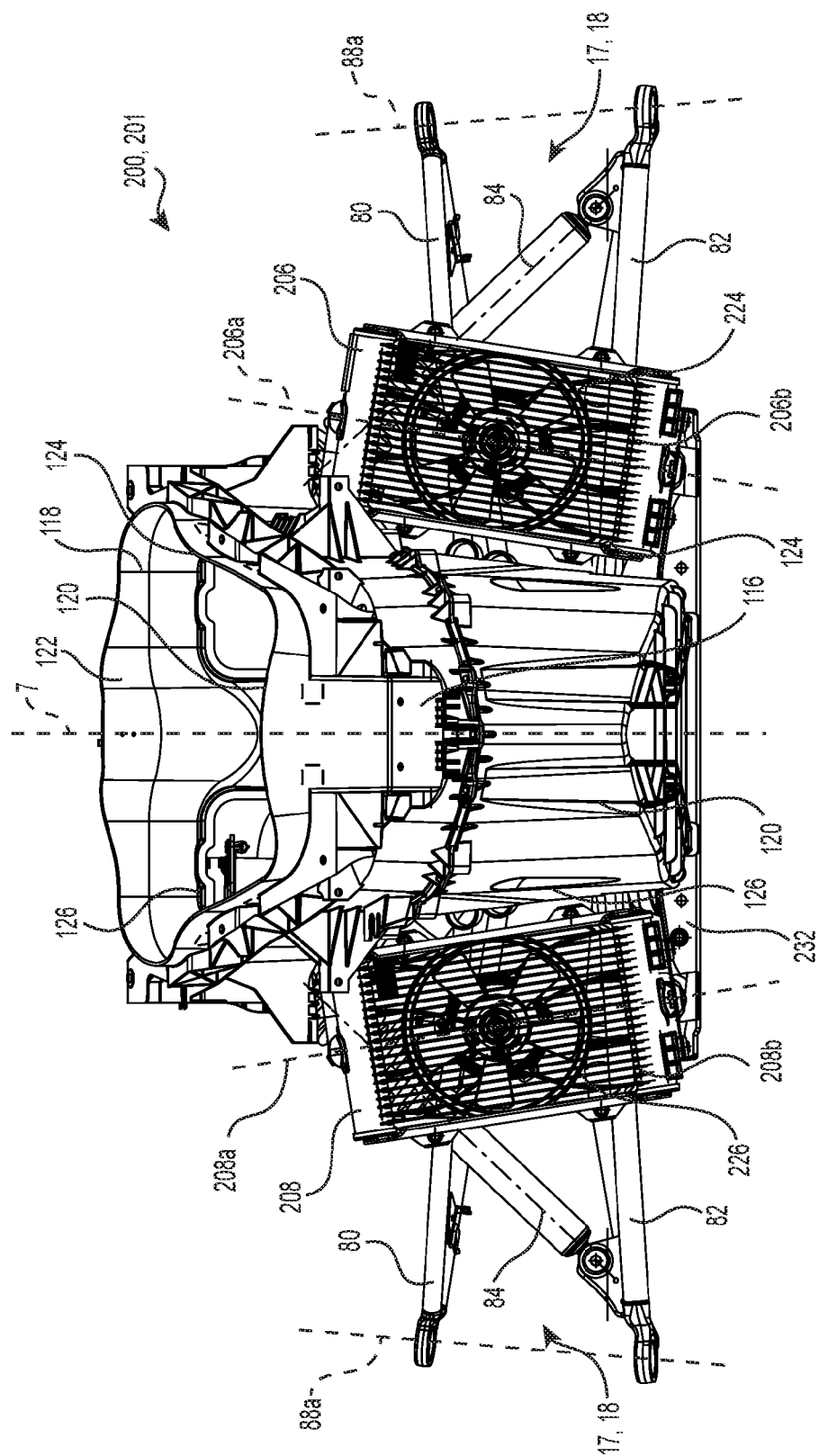
FIG. 6 is a front elevation view of the radiator assembly, storage bin and front suspension assembly of FIG. 5.
Figure 7:
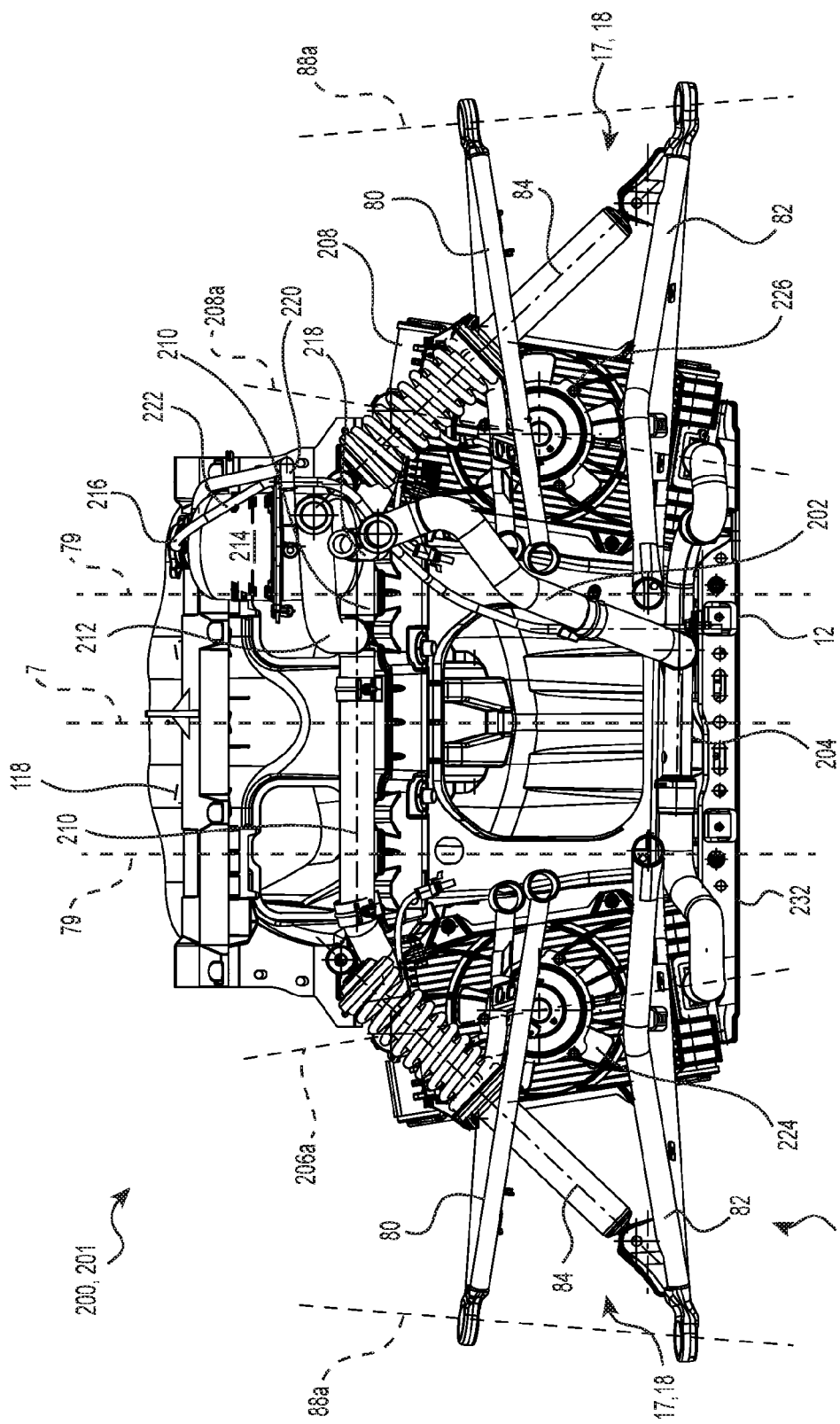
FIG. 7 is a rear elevation view of the radiator assembly, storage bin and front suspension assembly of FIG. 5.
Figure 8:
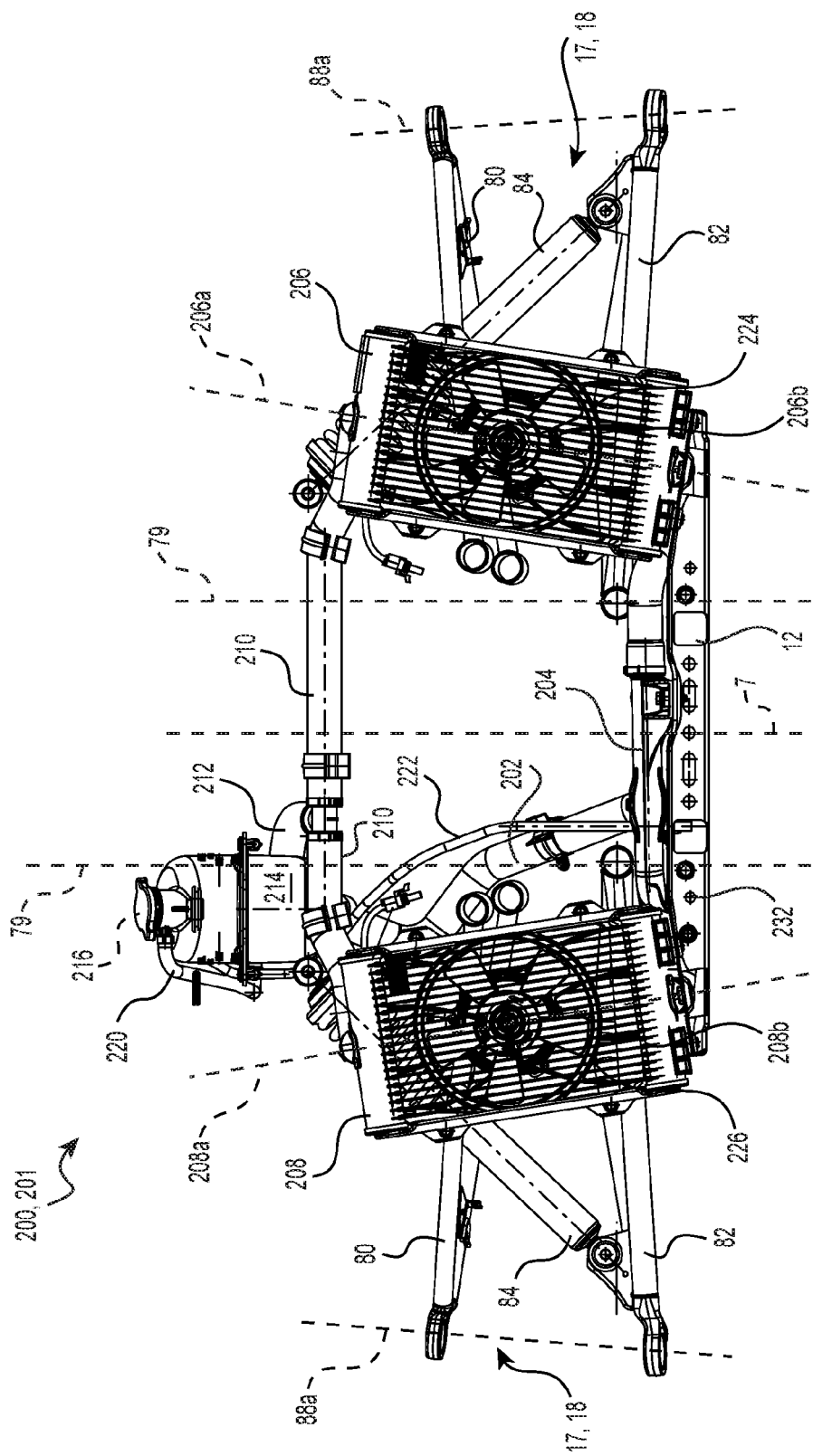
FIG. 8 is a front elevation view of the radiator assembly and front suspension assembly of FIG. 5 with the storage bin removed for clarity.
Figure 11B:
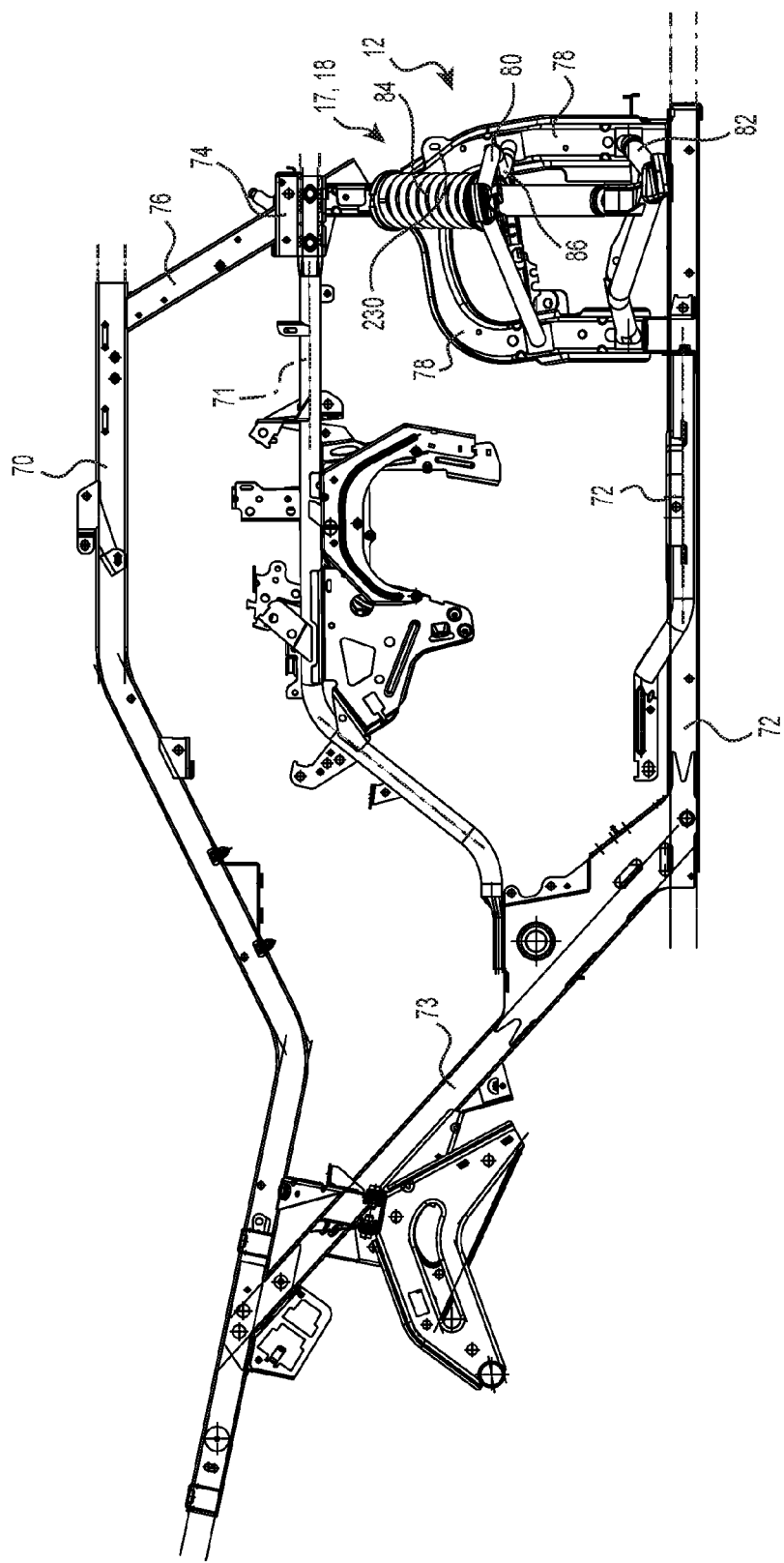
FIG. 11B is a right side elevation view of the front suspension assembly and frame of FIG. 11A.

With reference to FIGS. 6 to 8, the left and right radiators 206, 208 are attached, by their respective lower edges, to a radiator attachment bracket 232 connected to the front end of the lower member 72. The upper edge of the left radiator 206 is also attached, as can be seen in FIG. 12, to the left suspension module 78 by an attachment bracket 230 (FIGS. 11A to 12). Similarly, right radiator 208 is attached to the right suspension module 78 by a right attachment bracket 230 (FIG. 11A, 11B). The radiators 206, 208 are attached to the forwardmost portion of the frame 12 to prevent obstruction of airflow to the radiators 206, 208 by a portion of the frame 12 and or front suspension 17.

The right radiator 208 is a mirror image of the left radiator 206 and as such only the right radiator 208 will be described below.

With reference to FIGS. 6 to 8, the right radiator 208 is disposed with its upper and lower edges at an angle with respect to the horizontal. Its left and right edges are disposed at an angle with respect to the vertical. The line 208a (FIG. 6) bisecting the upper and lower edges is disposed at an angle with respect to the longitudinal centerplane 7. As can be seen, the line 208a slopes rightwardly (laterally outwardly) from the lower edge to the upper edge of the right radiator 208. It is however contemplated that the radiator 208 could be mounted with its upper and lower edges being disposed horizontally and its left and right edges being disposed vertically. In this case, the line 208a would be vertical.

The upper edge of the right radiator 208 extends above the right upper A-arm 80 and below the upper end of the right shock absorber 84. The lower edge of the right radiator 208 is disposed below the right lower A-arm 82. It is contemplated that the right radiator 208 could be disposed higher or lower than as shown herein.

The left edge of the right radiator 208 is disposed on a right side of the right side wall 126 of the storage bin 118 and spaced therefrom. It is contemplated that the spacing between the storage bin 118 and the right radiator 208 could be greater or less than as shown herein.

With respect to FIGS. 9 and 14, the right radiator 208 is between the right steering axis 88a and a vertical plane passing through the innermost end of the suspension arms 80, 82. The radiator 208 is in front of the plane 89 including the left and right steering pivot axis 88a. The coolant flowing through the radiators 206, 208 passes above at least one of the suspension A-arms 80, 82, specifically above a plane including the connection of that A-arm 80, 82 with the frame 78 and the connection point of that A-arm 80, 82 with the knuckle 88.

With reference to FIGS. 9, 10, 11 and 13, the upper, lower, left and right edges of the right radiator 208 are longitudinally aligned such that the front surface 208b (inlet surface 206b) of the right radiator 208 is normal to the longitudinal centerline 6. It is contemplated that the right radiator 208 could be mounted such that the longitudinal centerline 6 is at a non-normal angle with respect to the inlet surface 208b as can be seen in the implementation illustrated in FIG. 15.

The right fan 226 is disposed rearward of the right radiator 208 and forward of the right suspension assembly 18. The right fan 226 is disposed in front of the middle bent portion 86 of the front member of the upper A-arm 80. The middle bent portion 86 is provided to accommodate the right fan 226.

The right radiator 208 is disposed laterally between the steering pivot axis 88a of the right wheel 14 and the left end of the right front suspension assembly 18. The right radiator 208 is disposed laterally between the inner and outer ends of the right front suspension assembly 18.

The right radiator 208 is longitudinally aligned with the rear wall 122 of the storage bin 118. It is contemplated that the storage bin 118 could extend further forward or rearward than as shown herein.

With reference to FIG. 2, when viewed from the right side, the right radiator 208 is disposed within a cylinder 260 circumscribing the right wheel 14 (when the wheel is not turned or steered, and with the vehicle 10 at rest on a level surface and with the front 17 and rear suspensions in an unloaded configuration.) The right radiator 208 is located longitudinally forward of the axis of rotation 14a of the right wheel 14. The lower edge of the right radiator is disposed vertically lower than the output shaft axis 60.

With reference to FIGS. 9, 10, 12 and 13, coolant tank 214 is disposed longitudinally rearward of the right radiator 208 and vertically higher than the upper edge of the right radiator 208. The coolant tank 214 is disposed just rearward of the rear wall 122 of the storage bin 118 with its cap 216 approximately at the same level as the top edge of the rear wall 122 as can be seen best in FIG. 7. An upper portion of the coolant tank 214 is disposed above the right front suspension assembly 18. The coolant tank 214 is disposed longitudinally between the front and rear members of the upper and lower A-arms 80, 82. The right shock absorber 84 extends rightwardly and vertically below the coolant tank 214. It is contemplated that the coolant tank 214 could be mounted rearward of the left radiator 206 instead of the right radiator 208.

With reference to FIG. 14, the power steering unit 58 is disposed longitudinally rearward of the left and right radiators 206, 208. A portion of the motor 59 is disposed rearward of the right radiator 208.

With reference to FIG. 12, the left steering linkage 56 connecting the motor of the power steering unit 58 to the left wheel 14 is disposed vertically between the upper and lower edges of the left radiator 206.

Figure 15:
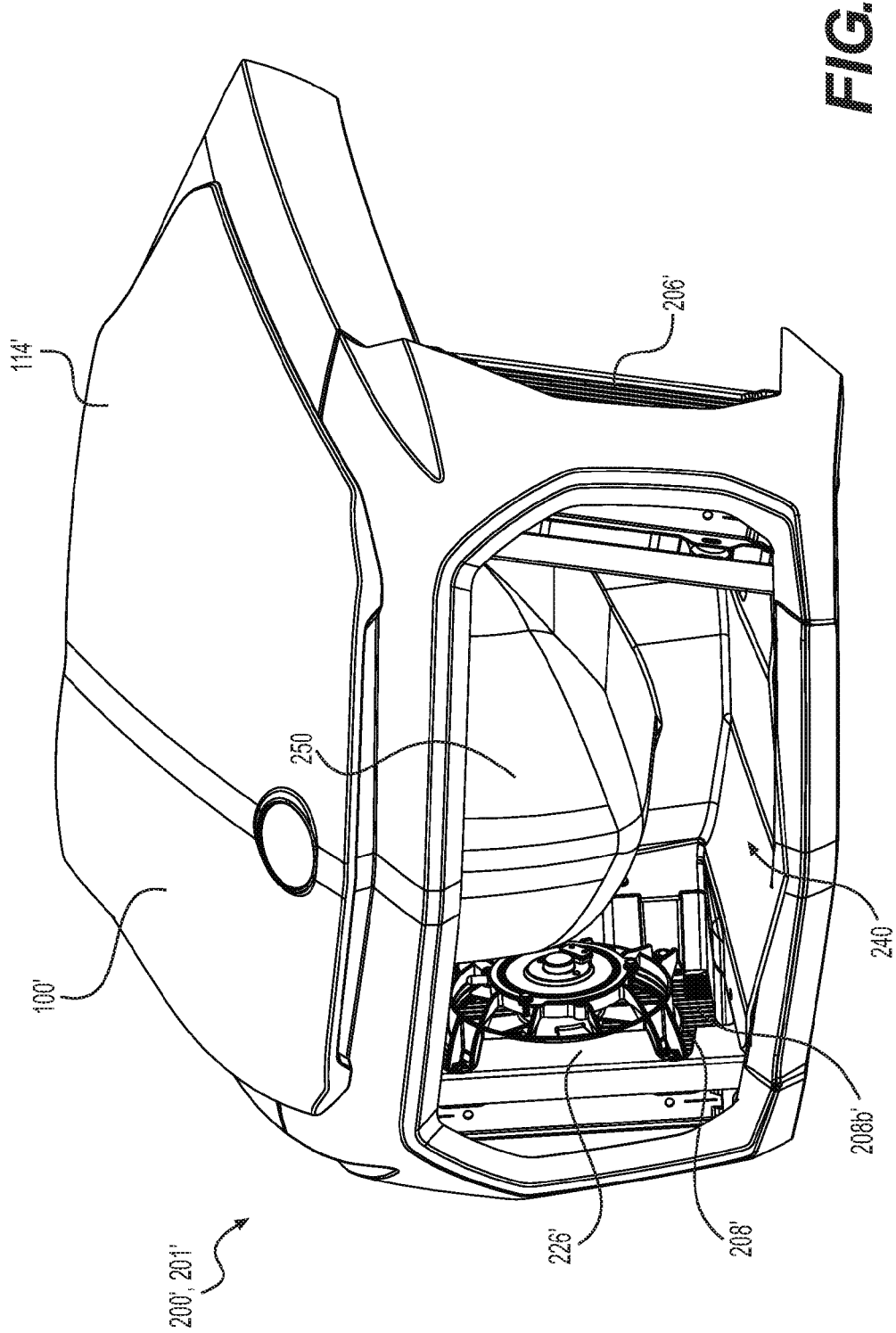
FIG. 15 is a perspective view, taken from a front left side, of a front portion of the vehicle of FIG. 1 showing a front cowling assembly and radiator assembly according to another implementation, with the storage bin removed for clarity.
Figure 16:
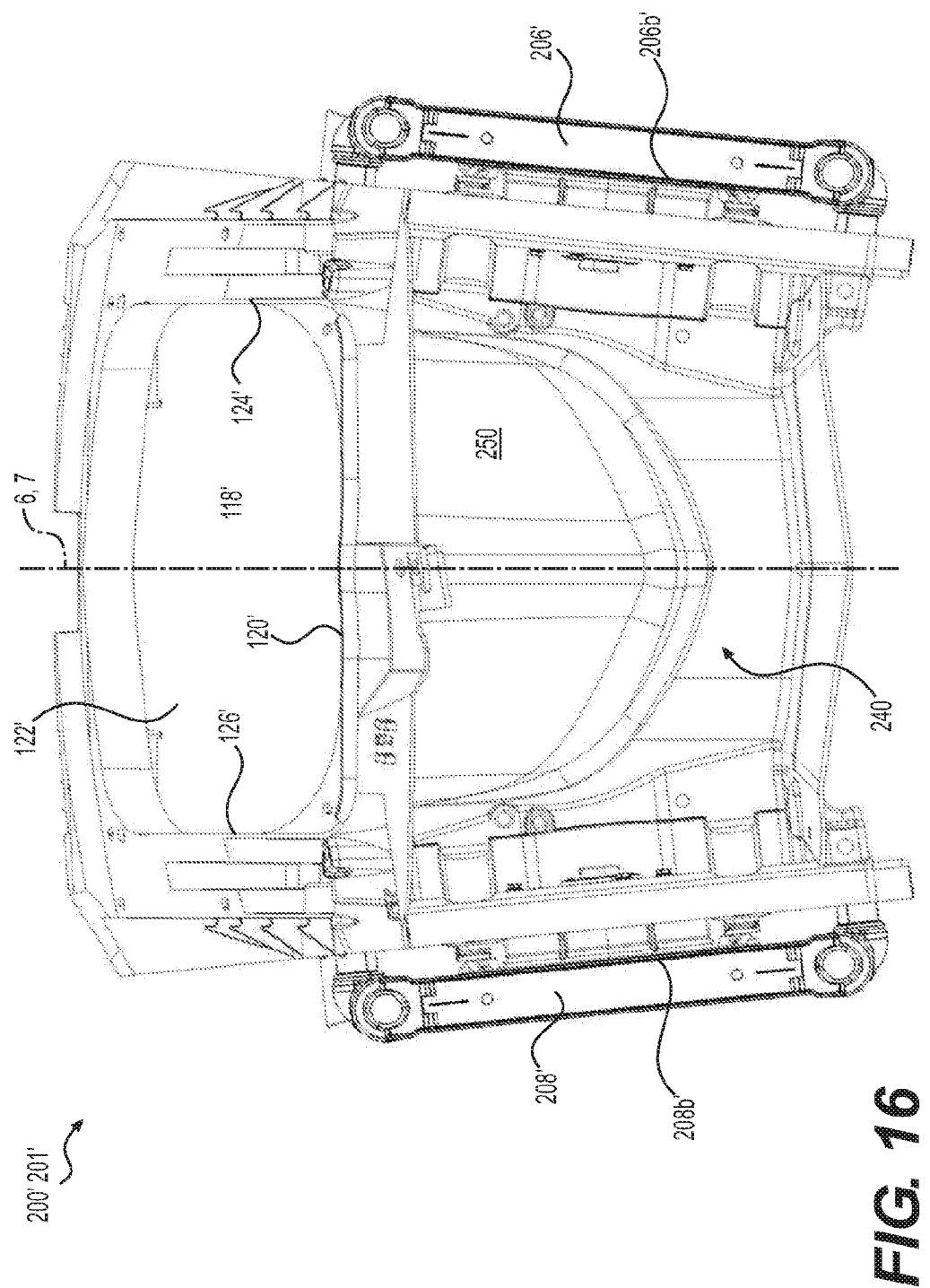
FIG. 16 is a front elevation view of the radiator assembly of FIG. 15, with the cowling assembly removed for clarity.
Figure 17:
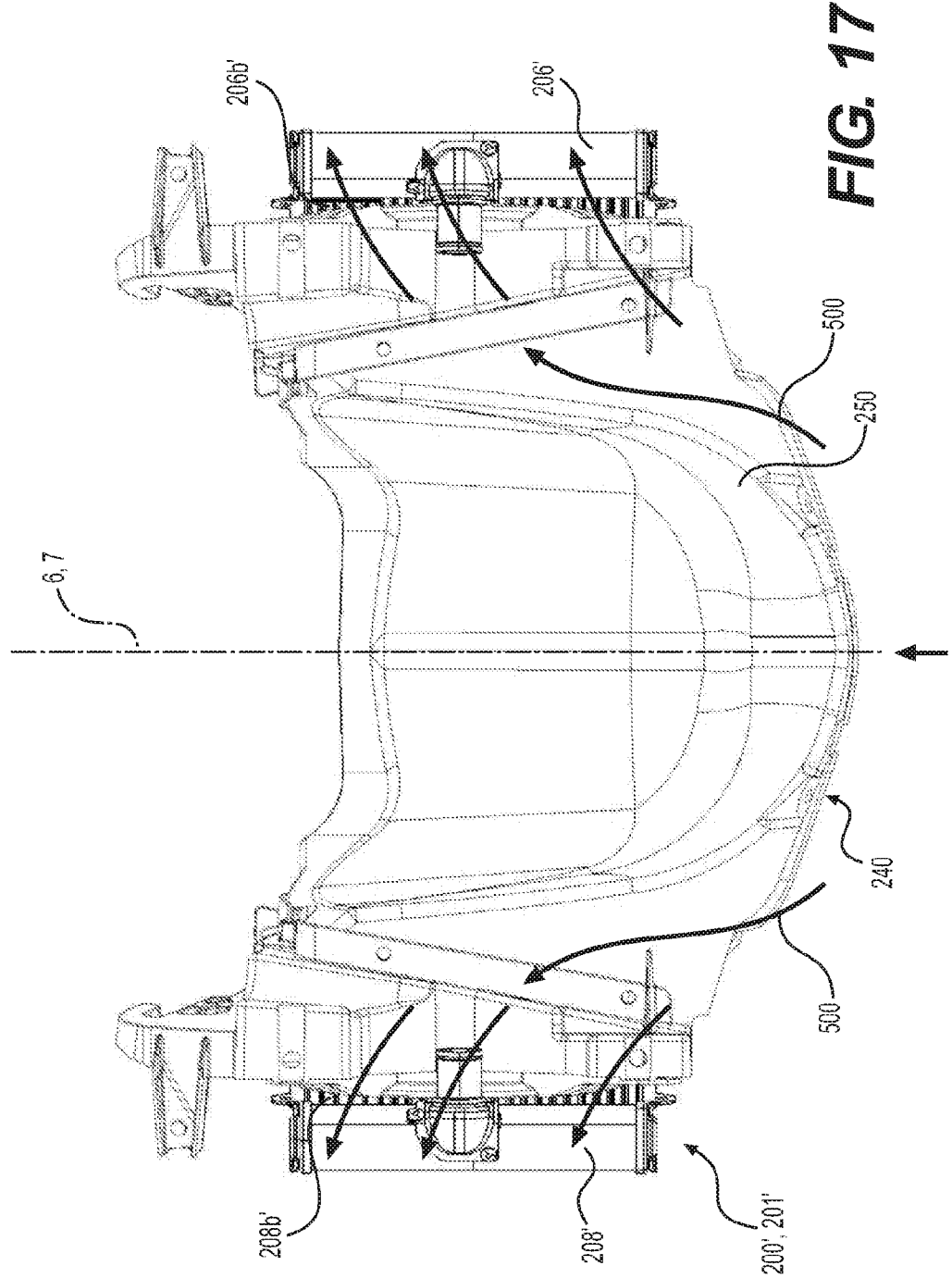
FIG. 17 is a top plan view of the radiator assembly of FIG. 16 with the storage bin removed for clarity.

With reference to FIGS. 15 to 17, the cowling assembly 100', radiator assembly 201' and the storage bin 118' are similar to the cowling assembly 100, radiator assembly 201 and storage bin 118 shown in FIGS. 2 to 10, 12 and 13. Features of the cowling assembly 100', radiator assembly 201' and storage bin 118' that are similar to corresponding features of the cowling assembly 100, radiator assembly 201, and storage bin 118 above, have been labeled with the same reference numbers, with an apostrophe added thereafter, and will not be discussed herein in detail except with regard to their differences. The right radiator 208' is a mirror image of the left radiator 206' and as such, only the right radiator 208' will be described below.

The cowling assembly 100' has a single central inlet 240 instead of the left and right inlets 132, 134 shown in FIG. 4. The inlet 240 is facing forwardly to receive air from the front of the vehicle 10. The inlet 240 is covered by a grill (not shown) to prevent entry of debris etc.

The upper and lower edges of the right radiator 208' are disposed extending horizontally, and the left and right edges of the radiator 208' are disposed extending vertically. The right radiator 208' is mounted such that the inlet surface 208b' is disposed at a non-normal angle to the longitudinal centerline 6. The inlet surface 208b' is facing inwardly towards the longitudinal centerline 6 and the right wall 126 of the storage bin 118'.

A deflector 250 is provided to direct air flow 500 from the front of the vehicle 10 toward the right and left radiators 206, 208. The deflector 250 extends across the front surface of the front wall 120 of the storage bin 118. From the front of the storage bin 118, the deflector 250 extends rearwards between the left wall 124 and the left radiator 206. The deflector 250 extends rearwards between the right wall 126 and the right radiator 208. As the deflector 250 extends further rearwardly from the front wall 120, the deflector 250 extends further towards the right side and closer to the inlet surface 208b so as to direct air flow 500 rearward between the storage bin 118 and the right radiator 208 and rightward through the radiator 208 for cooling the coolant liquid flowing therein.

As the radiator 208' shown in FIGS. 15 to 17 does not extend laterally outwardly of the storage bin 118' as much as the radiator 208 in the implementation of the cowling assembly 100 of FIGS. 2 to 10, 12 and 13, a vehicle 10 having the radiator assembly 201' of FIGS. 15 to 17 could be narrower than the vehicle 10 of the previous figures.

A left fan 226' is mounted between the inlet surface 208b and the right wall 124 of the storage bin 118'. The fan 226' is mounted so as to pull air from the front of the vehicle 10 rearward through the space between the storage bin 118' and the radiator 208' and then out leftwardly through the radiator 208'.

The above description is provided with reference to a radiator assembly 201, 201' having a pair of radiators, 206 and 208 or 206' and 208', where the left radiator 206, 206' is a mirror image of the corresponding right radiator 208, 208'. It is however contemplated that the left radiator 206, 206' could not be a mirror image of the corresponding right radiator 208, 208'. It is also contemplated that the radiator assembly 201, 201' could include only the left radiator 206, 206' or only the right radiator 208, 208'. It is also contemplated that the radiator assembly 201, 201' could have one or more radiators other than the left radiator 206, 206' and/or the right radiator 208, 208' described above.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a straddle seat supported by the frame;
a left front wheel and a right front wheel operatively connected to the frame;
at least one rear wheel operatively connected to the frame;
a motor operatively connected to at least one of the wheels;
a front cowling assembly supported by the frame;
a storage bin disposed at least in part inside the front cowling assembly; and
at least one radiator fluidly communicating with the motor for cooling the motor,
at least a portion of at least one of the at least one radiator being longitudinally and vertically aligned with at least a portion of the storage bin.

2. The vehicle of claim 1, wherein:
the portion of the storage bin is a first portion of the storage bin; and
at least a second portion of the storage bin extends longitudinally forward of the at least one of the at least one radiator.

3. The vehicle of claim 1, wherein a projection of the storage bin onto a vertical plane containing a longitudinal centerline of the vehicle encompasses a projection of the radiator onto the vertical plane.

4. The vehicle of claim 1, wherein the at least one radiator comprises:
a left radiator disposed at least in part on a left side of the storage bin; and
a right radiator disposed at least in part on a right side of the storage bin.

5. The vehicle of claim 4, wherein the storage bin comprises:
a front wall;
a left side wall extending rearwardly from a left side of the front wall;
a right side wall extending rearwardly from a right side of the front wall; and
a rear wall connected between rear ends of the left and right side walls, at least a portion of the rear wall being disposed laterally between the left and right radiators and being longitudinally aligned with the left and right radiators.

6. The vehicle of claim 5, wherein at least a portion of the rear wall is disposed vertically higher than the left and right radiators.

7. The vehicle of claim 6, wherein an upper edge of the front wall is lower than an upper edge of the rear wall, and upper ends of the left and right radiators are disposed vertically lower than at least a portion of the upper edge of the front wall.

8. The vehicle of claim 5, wherein:
at least a portion of the left side wall extends rightwardly away from the rear wall towards the front wall; and
at least a portion of the right side wall extends leftwardly away from the rear wall towards the front wall.

9. The vehicle of claim 4, further comprising a coolant passage fluidly communicating the left radiator with the right radiator, the motor fluidly communicating with the left and right radiators via the coolant passage.

10. The vehicle of claim 9, wherein the coolant passage is disposed rearward of the storage bin.

11. The vehicle of claim 4, wherein:
a first line bisecting an upper edge and a lower edge of the left radiator is inclined with respect to a vertical plane containing the longitudinal centerline of the vehicle; and
a second line bisecting an upper edge and a lower edge of the right radiator is inclined with respect to the vertical plane.

12. The vehicle of claim 11, wherein the storage bin comprises:
a left side wall disposed rightward of the left radiator; and
a right side wall disposed leftward of the right radiator,
the first line being inclined leftwardly from the lower edge to the upper edge of the left radiator, at least a portion of the left side wall being inclined leftwardly away from a lower edge thereof toward an upper edge thereof; and
the second line being inclined rightwardly from the lower edge to the upper edge of the right radiator, at least a portion of the right side wall being inclined rightwardly away from a lower edge thereof toward an upper edge thereof.

13. The vehicle of claim 4, further comprising:
a left front suspension assembly connecting the left front wheel to the frame;
a right front suspension assembly connecting the right front wheel to the frame;
a left fan disposed longitudinally between left radiator and the left suspension assembly and being adapted to force air through the left radiator; and
a right fan disposed longitudinally between the right radiator and the right suspension assembly and adapted to force air through the right radiator.

14. The vehicle of claim 1, wherein at least the portion of the at least one of the at least one radiator is disposed within a cylinder circumscribing the front wheels, with the front wheels in a straight ahead orientation.

15. The vehicle of claim 1, further comprising at least one fan being adapted to force air through the at least one radiator.

16. The vehicle of claim 1, wherein an inlet surface of the one of the at least one radiator is disposed in a direction normal to a longitudinal centerline of the vehicle.

17. The vehicle of claim 1, further comprising:
a left front suspension assembly connecting the left front wheel to the frame;
a right front suspension assembly connecting the right front wheel to the frame;
an output shaft operatively connected to the motor and defining an output shaft axis extending laterally, the output shaft axis being disposed longitudinally rearward of the left and right front suspension assemblies; and
a steering assembly including a handlebar operatively connected to the left front wheel and the right front wheel for steering the vehicle, the handlebar being disposed rearward of the output shaft axis.

18. The vehicle of claim 1, further comprising:
a left front suspension assembly connecting the left front wheel to the frame;
a right front suspension assembly connecting the right front wheel to the frame;
an output shaft operatively connected to the motor and defining an output shaft axis extending laterally, the output shaft axis being disposed longitudinally rearward of the left and right front suspension assemblies; and
a left footrest and a right footrest disposed vertically lower than the seat and longitudinally rearward of the output shaft axis.

19. The vehicle of claim 1, further comprising:
a left front suspension assembly connecting the left front wheel to the frame;
a right front suspension assembly connecting the right front wheel to the frame;
an output shaft operatively connected to the motor and defining an output shaft axis extending laterally, the output shaft axis being disposed longitudinally rearward of the left and right front suspension assemblies,
wherein at least a portion of one of the at least one radiator is disposed vertically lower than the output shaft axis.

20. The vehicle of claim 1, further comprising a power steering motor operatively connected to the left and right front wheels, the power steering motor being disposed longitudinally rearward of the at least one of the at least one radiator.

* * * * *